(12) United States Patent
Dagdeviren et al.

(10) Patent No.: US 11,783,627 B2
(45) Date of Patent: Oct. 10, 2023

(54) METHODS AND APPARATUS FOR DETECTING AND CLASSIFYING FACIAL MOTIONS

(71) Applicant: Massachusetts Institute of Technology, Cambridge, MA (US)

(72) Inventors: Canan Dagdeviren, Cambridge, MA (US); Farita Tasnim, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 434 days.

(21) Appl. No.: 17/163,410

(22) Filed: Jan. 30, 2021

(65) Prior Publication Data

US 2021/0256246 A1    Aug. 19, 2021

Related U.S. Application Data

(60) Provisional application No. 62/972,465, filed on Feb. 10, 2020.

(51) Int. Cl.
*G06V 40/16* (2022.01)
*G06F 3/01* (2006.01)
*G06N 20/00* (2019.01)

(52) U.S. Cl.
CPC ............ *G06V 40/166* (2022.01); *G06F 3/012* (2013.01); *G06F 3/017* (2013.01); *G06N 20/00* (2019.01);
(Continued)

(58) Field of Classification Search
CPC .. G06V 40/166; G06V 40/172; G06V 40/174; G06F 3/012; G06F 3/017; G06N 20/00
See application file for complete search history.

(56) References Cited

U.S. PATENT DOCUMENTS

| 8,218,825 B2 | 7/2012 | Gordon et al. |
| 2010/0109998 A1* | 5/2010 | Hwang .................. G06V 40/16 345/156 |

(Continued)

OTHER PUBLICATIONS

Burt, et al.; "Think Multi-Site Sensors for Continuous Body Temperature Measurement"; Note 7069; Maximum Integrated; Jan. 2014; 9 Pages.

(Continued)

*Primary Examiner* — Md K Talukder
(74) *Attorney, Agent, or Firm* — DALY, CROWLEY, MOFFORD & DURKEE, LLP

(57) ABSTRACT

A conformable sensor module may conform to skin of a user's face. The sensor module may include multiple piezoelectric strain sensors. The sensor module may measure mechanical strain of facial skin that occurs while the user makes facial gestures. To do so, the sensor module may take a time series of multiple measurements of strain of the user's facial skin at each of multiple locations on the user's face, while the user makes a facial gesture. The resulting spatiotemporal data regarding facial strain may be fed as an input into a trained machine learning algorithm. The trained machine learning algorithm may, based on this input, classify a facial gesture. A computer may determine content associated with the classification. The content may be outputted in audible or visual format. This may facilitate communication by patients with neuromuscular disorders who are unable to vocalize intelligible speech.

18 Claims, 13 Drawing Sheets

(52) U.S. Cl.
CPC .......... *G06V 40/172* (2022.01); *G06V 40/174* (2022.01)

(56) References Cited

U.S. PATENT DOCUMENTS

| | | | |
|---|---|---|---|
| 2013/0249545 A1* | 9/2013 | Horsley | G01R 33/091 324/252 |
| 2013/0300521 A1* | 11/2013 | Khine | H03H 9/54 333/187 |
| 2014/0180624 A1 | 6/2014 | Nikonov et al. | |
| 2014/0268099 A1* | 9/2014 | Moslehi | G01L 1/246 356/32 |
| 2015/0148619 A1 | 5/2015 | Berg et al. | |
| 2016/0162022 A1* | 6/2016 | Seth | G06F 3/014 345/156 |
| 2016/0250015 A1* | 9/2016 | Kim | A61F 2/105 623/15.12 |
| 2016/0313801 A1* | 10/2016 | Wagner | G06F 1/163 |
| 2018/0138391 A1* | 5/2018 | Grosh | H04R 17/00 |
| 2018/0213339 A1* | 7/2018 | Shah | H04R 25/558 |
| 2020/0087824 A1 | 3/2020 | Ou et al. | |
| 2020/0110890 A1* | 4/2020 | Woo | H04L 67/535 |
| 2020/0380259 A1* | 12/2020 | Cahill | G06T 13/40 |
| 2021/0256246 A1* | 8/2021 | Dagdeviren | G06V 40/174 |
| 2021/0333882 A1* | 10/2021 | von und zu Liechtenstein | G06F 3/015 |
| 2021/0356345 A1* | 11/2021 | Li | G02F 1/155 |
| 2022/0142573 A1* | 5/2022 | Li | A61B 5/14542 |

OTHER PUBLICATIONS

Chen et al.; "Smart Clothing: Connecting Human with Clouds and Big Data for Sustrainable Health Monitoring"; Mobile Networks and Applications; vol. 21; pp. 825-845; Jul. 6, 2016; 21 Pages.

Hughes-Riley, et al; "A Study of Thermistor Performance within a Textile Structure"; Sensors 2017, 17, 1804; Aug. 5, 2017; 14 Pages.

Jones; "The Application of Temperature Sensors into Fabric Substrates"; Master's Thesis, Kansas State University; Jan. 2011; 90 Pages.

Kang, et al.; "The Development of an IMU Integrated Clothes for Postural Monitoring Using Conductive Yarn and Interconnecting Technology"; Sensors; vol. 17, 2560; Nov. 7, 2017; 10 Pages.

Linz et al.; "Fully Integrated EKG Shirt based on Embroidered Electrical Interconnections with Conductive Yarn and Miniaturized Flexible Electronics"; Proceedings of the International Workshop on Wearable and Implantable Body Sensor Networks (BSN'06); Jan. 2006; 4 Pages.

Majumder, et al.; "Wearable Sensors for Remote Health Monitoring"; Sensors; vol. 17, 130; Jan. 12, 2017; 45 Pages.

Mattana, et al.; "Woven Temperatrue and Humidity Sensors on Flexible Plastic Substrates for E-Textile Applications"; IEEE Sensors Journal; vol. 13; No. 10; pp. 3901-3909; 9 Pages.

Ou, et al.; "SensorKnit; Architecting Textile Sensors with Machie Knitting"; 3D Printing and Additive Manufacturing; vol. 6; No. 1; pp. 1-11; Jan. 2019; 12 Pages.

Paradiso, et al.; "Textile Electrodes and Integrated Smart Textile for Reliable Biomonitoring"; 33rd Annual International Conference of the IEEE Engineering in Medicine and Biology Society; Aug. 30-Sep. 3, 2011; 4 Pages.

Paul, et al.; "A Smart Textile Based Facial EMG and EOG Computer Interface"; IEEE Sensors Journal; vol. 14; No. 2; pp. 393-400; Feb. 2014; 8 Pages.

Ryu, et al.; "A Knitted Glove Sensing System with Compression Strain for Finger Movements"; Smart Materials and Structures; vol. 27; Apr. 20, 2018; 8 Pages.

Sayem, et al.; "Review on Smart Electra-Clothing Systems (SeCSs)"; Mar. 15, 2019; 34 Pages.

Tao, et al.; "Bluetooth Low Energy-Based Washable Wearable Activity Motion and Electrocardiogram Textronic Monitoring and Communicating System"; Advanced Materials Technology; Jan. 2018; 6 Pages.

Xiong, et al.; "Compression Garments for Medical Therapy and Sports"; Polymer; vol. 10; Jun. 14, 2018; 19 Pages.

Zysset, et al.; "Textile Integrated Sensors and Actuators for Near-Infrared Spectroscopy"; Optics Express; vol. 21; No. 3; pp. 3213-3224; Feb. 1, 2013; 12 Pages.

Blaber, J., et al., Ncorr: Open-Source 2D Digital Image Correlation Matlab Software; published in Experimental Mechanics, vol. 55, pp. 1105-1122, year 2015.

Bu, N., et al., Measuring muscle movements for human interfaces using a flexible piezoelectric thin film sensor; published in 2008 30th Annual International Conference of the IEEE Engineering in Medicine and Biology Society; year 2008.

Dagdeviren, C., et al., Conformal piezoelectric systems for clinical and experimental characterization of soft tissue biomechanics; published in Nature Materials, vol. 14, pp. 728-736, May 2015.

Esposito, D., et al., A Piezoresistive Sensor to Measure Muscle Contraction and Mechanomyography; published in Sensors, 4, 18(8), 2553, Aug. 2018.

Izuka, M., et al., A new flexible piezoelectric pressure sensor array for the noninvasive detection of laryngeal movement during swallowing; published in The Journal of Physiological Sciences, vol. 68, pp. 837-846, Mar. 2018.

Li, Jing, et al., Review—Recent Progress in Flexible and Stretchable Piezoresistive Sensors and Their Applications; published in Journal of the Electrochemical Society, vol. 167, No. 3, Feb. 3, 2020.

Kalantarian, H., et al., Monitoring eating habits using a piezoelectric sensor-based necklace; published in Computers in Biology and Medicine, vol. 58, pp. 46-55, Mar. 2015.

Pan, B., et al., Two-dimensional digital image correlation for in-plane displacement and strain measurement: a review; published in Measurement Science and Technology, vol. 20, No. 6, Apr. 2009.

Salvador, S., et al., Toward accurate dynamic time warping in linear time and space; published in Intelligent Data Analysis, vol. 11, No. 5, Oct. 2007.

Scheirer, J., et al., Expression glasses: a wearable device for facial expression recognition; published in CHI '99 Extended Abstracts on Human Factors in Computing Systems, pp. 262-263, May 1999.

Solav, D., et al., MultiDIC: An Open-Source Toolbox for Multi-View 3D Digital Image Correlation; published in IEEE Access, Jun. 2018.

Solav, D., et al., Bone Pose Estimation in the Presence of Soft Tissue Artifact Using Triangular Cosserat Point Elements; published in Annals of Biomedical Engineering, 44(4), pp. 1181-1190, Apr. 2016.

Solav, D., et al., Chest Wall Kinematics Using Triangular Cosserat Point Elements in Healthy and Neuromuscular Subjects; published in Annals of Biomedical Engineering, 45(8), pp. 1963-1973, Aug. 2017.

Su, M., et al., Nanoparticle Based Curve Arrays for Multirecognition Flexible Electronics; published in Advanced Materials, 28, pp. 1369-1374, year 2016.

Varatharajan, R., et al., Wearable sensor devices for early detection of Alzheimer disease using dynamic time warping algorithm; published in Cluster Computing, vol. 21, pp. 681-690, year 2018.

Wan, Y., et al., Adaptive cost dynamic time warping distance in time series analysis for classification; published in Journal of Computational and Applied Mathematics, vol. 319, pp. 514-520, Aug. 2017.

Zhang, Z., et al., Dynamic Time Warping under limited warping path length; published in Information Sciences, vol. 393, pp. 91-107, Jul. 2017.

Zhou, B., et al., Expressure: Detect Expressions Related to Emotional and Cognitive Activities Using Forehead Textile Pressure Mechanomyography; published in Sensors, 20(3): 730, Jan. 28, 2020.

\* cited by examiner

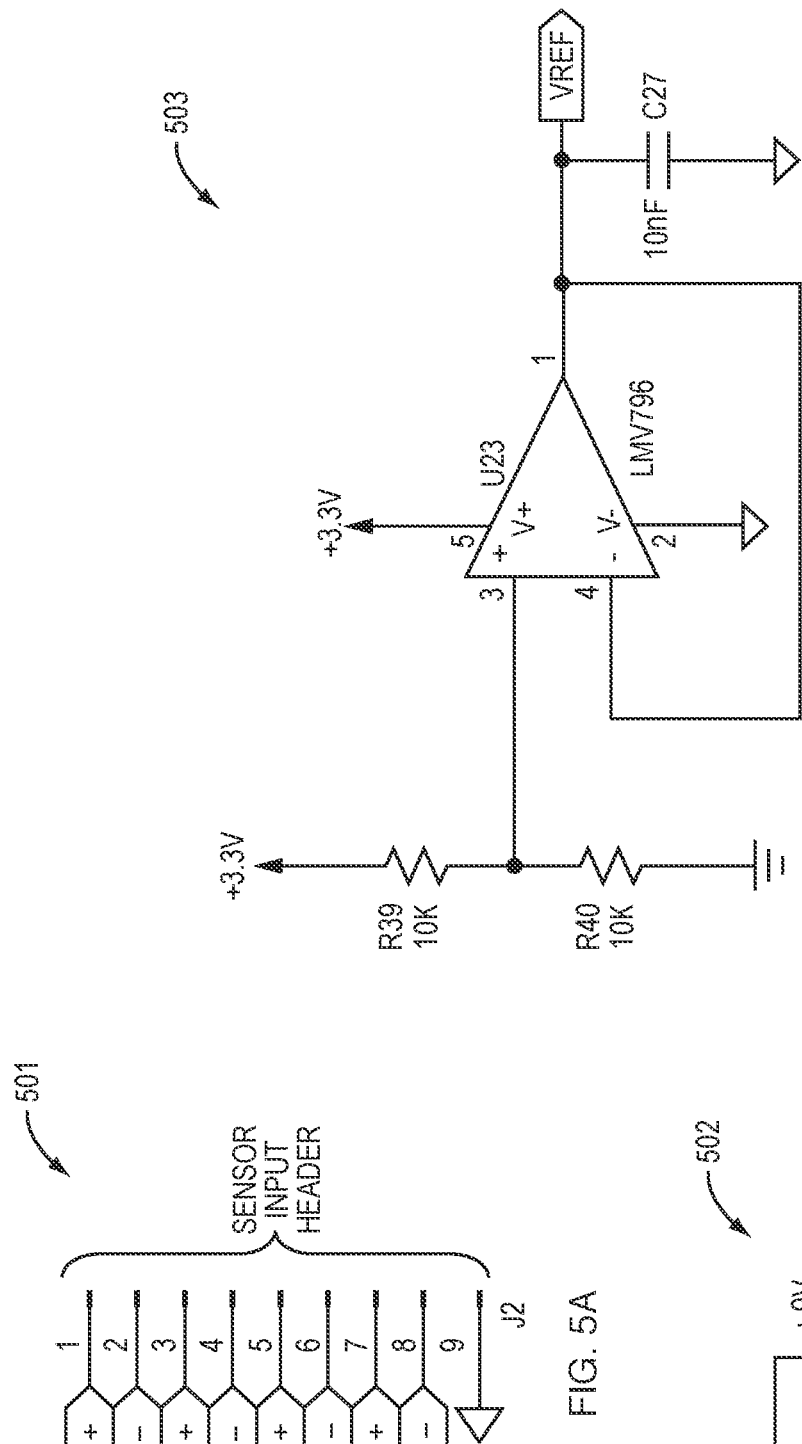
FIG. 5C
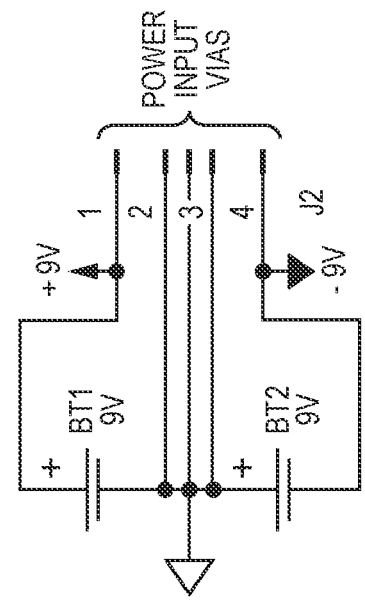
FIG. 5A
FIG. 5B

METHODS AND APPARATUS FOR DETECTING AND CLASSIFYING FACIAL MOTIONS

RELATED APPLICATIONS

This application claims the benefit of U.S. Provisional Application No. 62/972,465 filed Feb. 10, 2020 (the "Provisional").

FIELD OF TECHNOLOGY

The present invention relates generally to detecting and classifying facial motions.

COMPUTER PROGRAM LISTING

The following ten computer program files are incorporated by reference herein: (1) data_reformat_for_knndtw.txt with a size of about 2 KB; (2) knn_dtw_training.txt with a size of about 9 KB; (3) PT_Grey_Image_Acquisition.txt with a size of about 14 KB; (4) rt_calibrate_motions.txt with a size of about 6 KB; (5) rt_capture_waveforms.txt with a size of about 6 KB; (6) rt_classify_waveforms.txt with a size of about 4 KB; (7) rt_display_classification.txt with a size of about 1 KB; (8) rt_main.txt with a size of about 5 KB; (9) rt_reformat_calibration_data.txt with a size of about 4 KB; and (10) rt_util.txt with a size of about 2 KB. Each of these ten files were created as an ASCII .txt file on Dec. 28, 2020.

SUMMARY

In illustrative implementations of this invention, a conformable sensor module conforms to, and fits snugly against, skin of a user's face. The sensor module may measure mechanical strain of facial skin that occurs while the user makes facial gestures. To do so, the sensor module may take a temporal sequence of measurements of mechanical strain of facial skin at each of multiple locations on the user's face, while the user makes a facial gesture. The resulting spatiotemporal data regarding facial strain during a time window may be fed as an input into a trained machine learning algorithm. The trained machine learning algorithm may, based on this input, classify a facial gesture that occurred during this time window.

In illustrative implementations, the conformable sensor module includes multiple piezoelectric sensors. The spatiotemporal data fed into the machine learning algorithm may be data regarding voltage outputted by these multiple piezoelectric sensors at multiple times during a time window. For instance, data regarding a time window in which a facial gesture occurs may comprise a vector of voltage readings. The voltage output of each piezoelectric sensor may depend on the amount of mechanical strain to which that sensor is subjected.

For each piezoelectric sensor, the data that is fed into the machine learning algorithm may represent voltage outputted by the sensor as a discrete function of time. Thus, the machine learning algorithm may classify a facial gesture based on the shapes of respective voltage/time waveforms that represent measurements taken by respective piezoelectric sensors in the sensor module.

The machine learning algorithm (MLA) may be trained on a training dataset. This training dataset may include data regarding a set of facial gestures. For each particular facial gesture in the set, the training dataset may include spatiotemporal data regarding voltage outputted by the piezoelectric sensors while that particular facial gesture is made. The training dataset may be labeled. For instance, the spatiotemporal data for each respective facial gesture may be labeled with a label that identifies that facial gesture.

In some cases, the MLA is separately trained for each individual user based on data regarding only that user. Alternatively, the MLA may be trained on a dataset regarding facial gestures by a population of multiple users.

In some cases, the MLA comprises a dynamic-time warping, k-nearest neighbors (kNN-DTW) model. Alternatively, other types of machine learning algorithms may be employed.

In some cases, an integrated system includes: (a) a conformable sensor module which includes multiple piezoelectric sensors and which takes spatiotemporal measurements of mechanical strain of facial skin; and (b) one or more computers which perform calculations, including calculations for a machine learning algorithm.

The system may be employed to recognize a wide variety of facial gestures. As non-limiting examples, the system may be trained to recognize one or more of a blink, an eyebrow down, an eyebrow up, a facial twitch, a smile, an open mouth, pursed lips, mouthing the vowel "A", mouthing the vowel "I", mouthing the vowel "E", mouthing the vowel "O", and mouthing the vowel "U".

The set of facial gestures that the system is trained to recognize may be employed to communicate a wide variety of content. For instance, each facial gesture in the set may be associated with a particular word, phrase or message. The integrated system may store a lookup table that associates different facial gestures with different content. When the integrated system recognizes a particular facial gesture, the integrated system: (a) may determine which content is associated with that facial gesture, and (b) may output a signal which encodes this content or which comprises an instruction to a transducer to output this content in humanly perceptible form. For instance, the integrated system may output a signal that: (a) causes a display screen to visually display the content; or (b) causes a microphone to output sound that is audible to unaided human hearing and that conveys the content. As a non-limiting example, the integrated system: (a) may take piezoelectric sensor measurements while a user purses the user's lips; (b) may, based on these measurements, recognize this gesture as pursed lips; (c) may access a lookup table which associates pursed lips with the phrase "I'm thirsty"; and (d) may output a message which causes a display screen to visually display the phrase "I'm thirsty" or causes a microphone to output an audible message which says "I'm thirsty". Alternatively, when the integrated system recognizes a particular facial gesture, the system: (a) may determine that an instruction is associated with that facial gesture, and (b) may output a signal which encodes that instruction. For instance, the instruction may instruct an external device to perform an action (e.g., to turn a light on or off, or to heat or cool an object) or to change a state (e.g., to change the user's status to authenticated). In some cases, the instruction is an electrical signal or a wireless radio signal.

The set of facial gestures that the system is trained to recognize may be customized for each individual user. This ability to customize is highly advantageous in scenarios where the user has only a small repertoire of facial gestures due to a neuromuscular disease. For instance, a patient who has amyotrophic lateral sclerosis (ALS) may suffer muscle atrophy and a loss of fine motor control, which may render the patient unable to vocalize intelligible speech and unable to manually interact with conventional electronic input/ output devices. Yet such an ALS patient may still be able to make a small set of facial gestures. The integrated system may be customized to recognize the small set of facial gestures which a particular ALS patient is still able to make. This may enable the ALS patient to communicate, by making facial gestures that the integrated system recognizes.

In some cases, the system is re-trained from time-to-time for a particular user. For instance, this may be helpful where the user suffers from a neuromuscular disease that causes a progressive decline in motor function, which in turn causes (a) a progressive change in a characteristic pattern of movements that comprise a facial gesture and/or (b) a progressive reduction in the number of facial gestures that the user is then able to make.

In some cases, the system performs real-time decoding of facial gestures made by a user. For instance, in a test of a prototype of this invention, the average lag time between the end of a user's facial gesture and the display of a classification of that gesture was 1.71 seconds, with a standard deviation of 0.12 seconds.

In some cases, the sensor module includes multiple piezoelectric sensors. Each of these sensors may include an aluminum nitride (AlN) piezoelectric thin film sandwiched between two molybdenum (Mo) electrodes, and encapsulated by a layer of silicon dioxide ($SiO_2$) on an elastomeric substrate. For instance, the elastomeric substrate may comprise polydimethylsiloxane (PDMS), and may have an elastic modulus comparable to that of the human skin. Each respective sensor in the sensor module may be electrically connected, via a serpentine electrode, to an aluminum bonding pad which is in turn electrically connected to a signal processing board. The sensor module may remain stable across a wide range of temperatures and humidities on human skin.

In some cases, the sensor module is extremely thin. For instance, in some cases, in a piezoelectric sensor in the sensor module: (a) the thickness of the piezoelectric film is greater than or equal to 10 nanometers and less than or equal to 5 micrometers; (b) the thickness of the elastomeric substrate is greater than or equal to 10 nanometers and less than or equal to 10 micrometers; and (c) a silicon dioxide encapsulation layer is approximately 1 micrometer thick.

In illustrative implementations, the sensor module fits snugly against the user's face. For instance, the sensor module may be so thin and may conform so closely to the user's facial skin that tiny wrinkles in the user's skin cause the sensor module to elastically deform in such a way that matching wrinkles occur in the sensor module.

The sensor module may be attached to facial skin of a user by a transparent or translucent tape (e.g., Tegaderm® tape) that is applied over the sensor module. In some regions of the tape, the tape may adhere to the sensor module which is positioned between the tape and user's facial skin. Other regions of the tape may extend laterally past the edges of the sensor module. In these other regions, the tape may directly contact the user's facial skin. Alternatively, the sensor module may be attached to the user's facial skin by any other adhesive.

The sensor module may be non-allergenic and visually inconspicuous. This may make it easier to wear the sensor module for extended time periods. To make the sensor visually inconspicuous, cosmetic makeup may be applied over the tape. The makeup may have a skin tone and may tend to hide the tape and sensor module that are underneath the makeup. The sensor module may be so thin that it causes only a very small bump in the tape and makeup.

In some cases, the sensor module may be easily and repeatedly attached to and then removed from a user's facial skin, without causing damage or irritation to the skin. For instance, the sensor module may be attached to the user's skin by tape and may be removed from the skin by peeling the tape off the skin. Thus, a user may easily remove the sensor module at certain times, such as before going to sleep. This may prevent irritation of the skin that might otherwise occur if the sensor module were worn 24 hours a day for multiple days.

In some cases, the integrated system performs long-term monitoring of a disease that: (a) causes a progressive decline in motor function, and thus (b) causes measurable changes in patterns of facial skin strain associated with different facial gestures.

The integrated system may communicate with external device(s) via wireless radio signals or via one or more wired connections. The sensor module may be powered by one or more onboard batteries, or by a wired connection with an external power source, or by harvesting energy from wireless radio signals.

In some cases, during an initial calibration step, the accuracy of the piezoelectric sensors is evaluated as follows: The sensor module may be applied to the user's face. Visual fiducial markers may then be applied to the user's face (e.g., by placing a random pattern of black dots on makeup, where the makeup covers tape and the sensor module, and the sensor module touches the user's facial skin). An array of digital cameras may be positioned in such a way that each camera in the array images the user's face from a different angle. The cameras may capture a time sequence of images of the user's face while the user makes a facial gesture. Based on these images, a computer may calculate a spatiotemporal strain map which represents mechanical strain of the user's facial skin as a function of time and position during a time window in which the facial gesture occurs. To calculate this strain map, a computer may perform stereophotogrammetry and three-dimensional digital image correlation (3D-DIC). Based on this strain map, a computer may predict which spatiotemporal voltage pattern the piezoelectric sensor would measure during the facial gesture that produced the strain map. To make this prediction, a computer may employ an analytic model or FEM (finite element method) modeling. A computer may compare the predicted voltage pattern with the voltage pattern that was actually measured by the piezoelectric sensor during the facial gesture. If the predicted and measured voltage patterns are too different, then the computer may conclude that the sensor is not accurate; otherwise, the computer may validate the sensor. This validation algorithm may be performed separately for each respective piezoelectric sensor in a sensor module, or may instead be performed for an entire sensor module as a whole.

In some cases, the positions of the piezoelectric sensors relative to a user's face are selected during initial calibration, as follows: Spatiotemporal strain maps (of mechanical strain in the user's facial skin) may be calculated for each of multiple different facial gestures. To generate these strain maps, stereophotogrammetry and 3D-DIC may be performed as described in the preceding paragraph. The strain maps may be analyzed in order to identify a position and orientation of the sensor module (relative to the user's face) in which the strain maps for the respective facial gestures overlap in such a way that the sensor module as a whole could detect a distinctive spatiotemporal voltage pattern for each of the respective facial gestures. This analysis may be performed heuristically (e.g. by a human). Or a computer may analyze these strain maps to automatically select a position and orientation of the sensor module as a whole (relative to the user's face) which is predicted to yield the most accurate classification of the multiple facial gestures. In some cases, this calibration process (which analyzes strain maps to determine optional positioning) is also used to select the position and orientation of the piezoelectric sensors (which are in the sensor module) relative to each other.

Once an optimal position and orientation of the sensor module is selected, it may be desirable to place the sensor module in this optimal position and orientation each time that the sensor module is applied to the user's face (e.g., each time the sensor module is applied in the morning after a user wakes up). In some cases, what we sometimes loosely call an "alignment scaffold" is employed to ensure that the sensor module is applied in the same optimal position each time. The scaffold may comprise a thin structure (e.g., fabric) that conforms to a portion of the user's face and that has external boundaries which correspond to easily recognized features on the user's face. The scaffold may have a hole in its center and may have an inner edge that forms this hole. To properly position the sensor module: (a) a first tape may be placed on the sensor module and a second tape may be placed on two edges of the scaffold; (b) the sensor module may be aligned with the scaffold by placing the first tape and sensor module under the hole in the scaffold, and positioning them in such a way that certain points in the sensor module are underneath certain points on the inner edge of the scaffold; (c) the scaffold may be temporarily attached to the sensor module by pressing the second tape against the first tape; (d) the scaffold may be aligned with the user's face by positioning the scaffold in such a way that certain points on the scaffold's external boundary touch certain features of the user's face (e.g., chin, jawline, or edge of nose); (e) the scaffold may be pressed toward the user's face causing the first tape to adhere to the user's face and to thereby hold the sensor module against the user's face; and (f) the scaffold and second tape may be removed, leaving the first tape and sensor module attached to the user's facial skin.

In some cases, the neutral mechanical plane (NMP) of each piezoelectric sensor is located very close to (e.g., within 200 nanometers of) the midplane of the piezoelectric active layer of the sensor. As a result, for almost all users, the steady-state output of each piezoelectric sensor may be approximately zero volts when the sensor module is attached to the user's face and the user's face is in a resting position (not actively making a gesture). This may facilitate using the sensor module for a wide range of individuals, despite differences in the resting positions of their faces.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

In FIG. 1A, the sensor module is attached to, and fits snugly against, a user's cheek. In FIG. 1B, the sensor module is attached to, and fits snugly against, a user's forehead.

FIGS. 4, 5A, 5B, 5C, 6, 7A and 7B are each a schematic diagram which shows a circuit that is included in a piezoelectric sensor.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Sensor Module

In illustrative implementations of this invention, a conformable sensor module includes multiple piezoelectric sensors. These sensors may simultaneously measure mechanical strain at multiple points on a user's face.

Figure 1A:
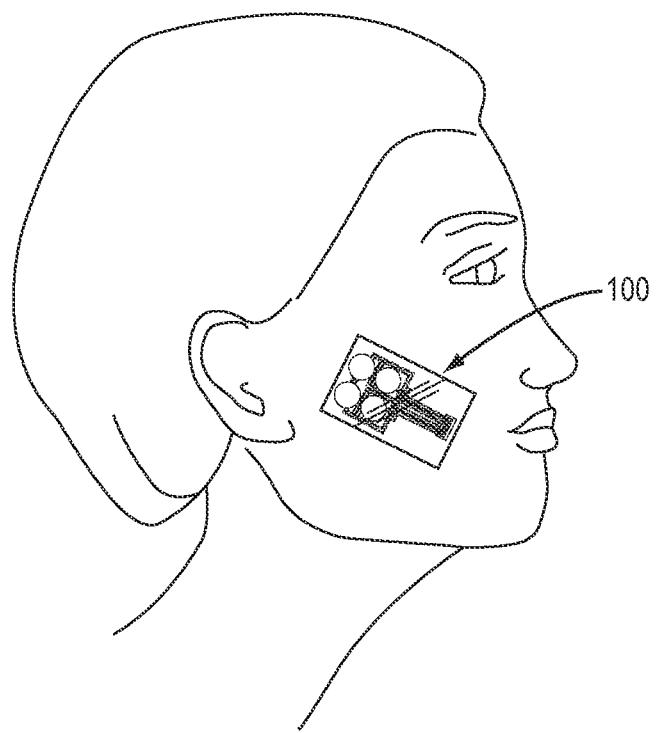
FIGS. 1A and 1B each show a conformable sensor module.
Figure 1B:
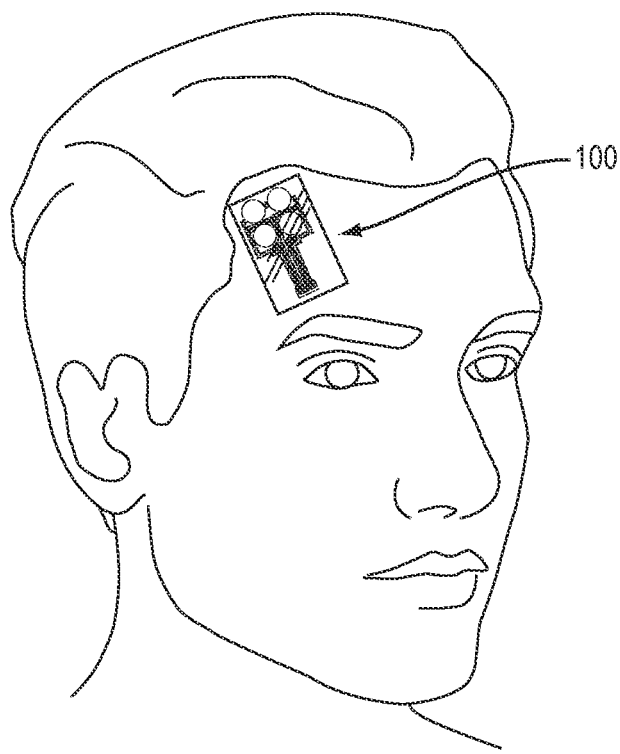

FIGS. 1A and 1B each show a conformable sensor module, in an illustrative embodiment of this invention. In FIG. 1A, the sensor module 100 is attached to, and fits snugly against, a user's cheek. In FIG. 1B, the sensor module 100 is attached to, and fits snugly against, a user's forehead. When actually deployed, sensor module 100 may be visually inconspicuous. For clarity of illustration, however, the sensor module appears darker and thicker in FIGS. 1A and 1B than it may in actual deployment. The sensor module may also be placed at other positions on a user's face (e.g., on a temple).

Figure 2:
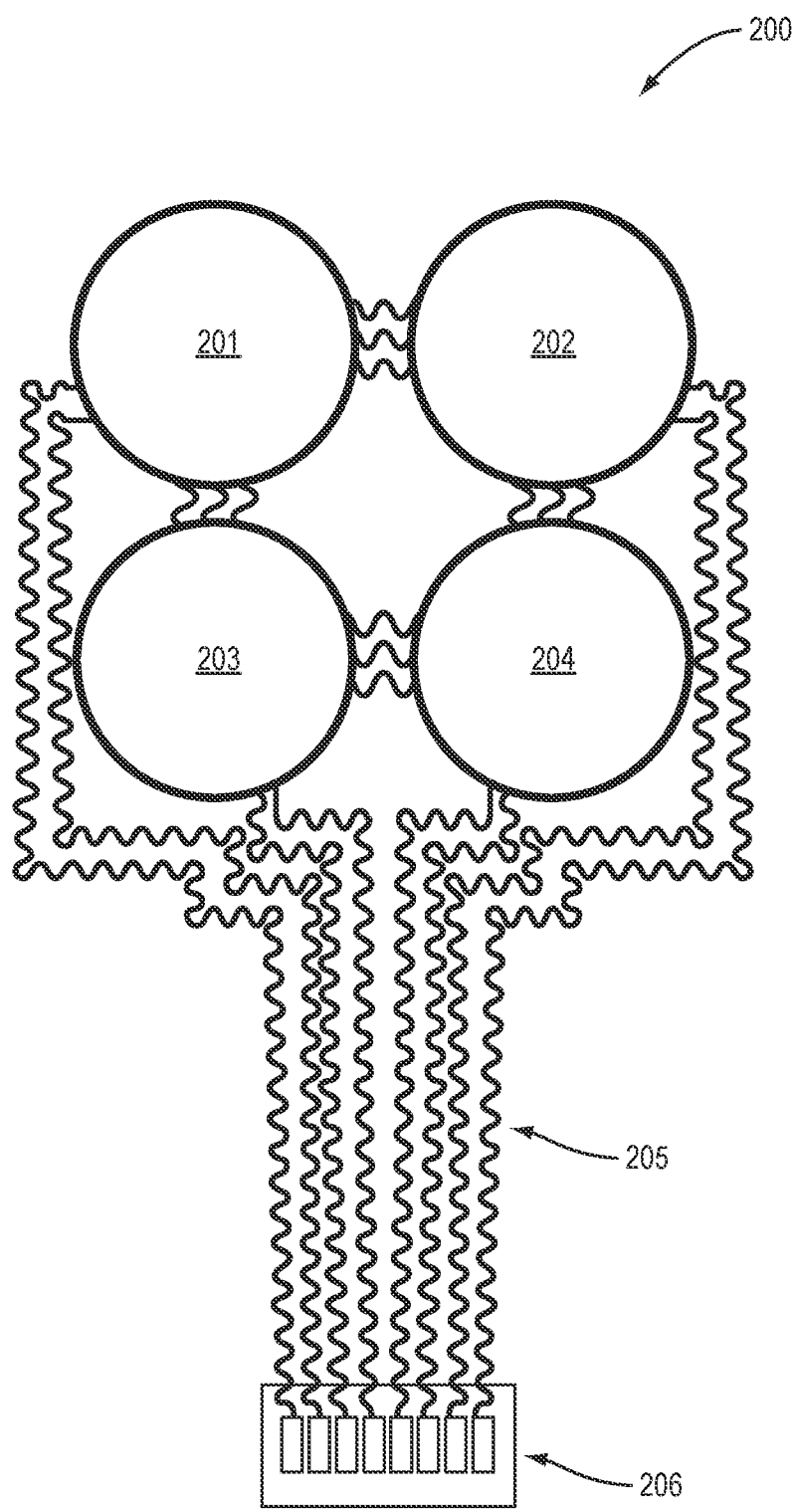
FIG. 2 shows a close-up view of a conformable sensor module.

FIG. 2 shows a close-up view of a conformable sensor module 200, in an illustrative implementation of this invention. The sensor module includes four circular piezoelectric sensors 201, 202, 203, 204. These sensors: (a) each include a piezoelectric sensor element; and (b) are electrically connected, via serpentine electrodes 205, to metal bonding pads 206. For instance, the piezoelectric sensor elements may each comprise aluminum nitride and the metal bonding pads may each comprise aluminum.

This invention is not limited to using only four piezoelectric sensors in a sensor module. For instance, in some cases, the number of piezoelectric sensors in a sensor module may be an integer greater than or equal to one and less than or equal to ten thousand. Increasing the total number of piezoelectric sensors in the sensor module may increase the spatial resolution of the sensor module and may thereby increase the accuracy of classifications performed by the integrated system. Likewise, increasing the density (i.e., number of sensors per unit area of facial skin) of sensors in the sensor module may increase the spatial resolution of the sensor module and may thereby increase the accuracy of classifications performed by the integrated system. Also, this invention is not limited to circular sensors. Any shape of piezoelectric sensor may be employed.

Figure 3:
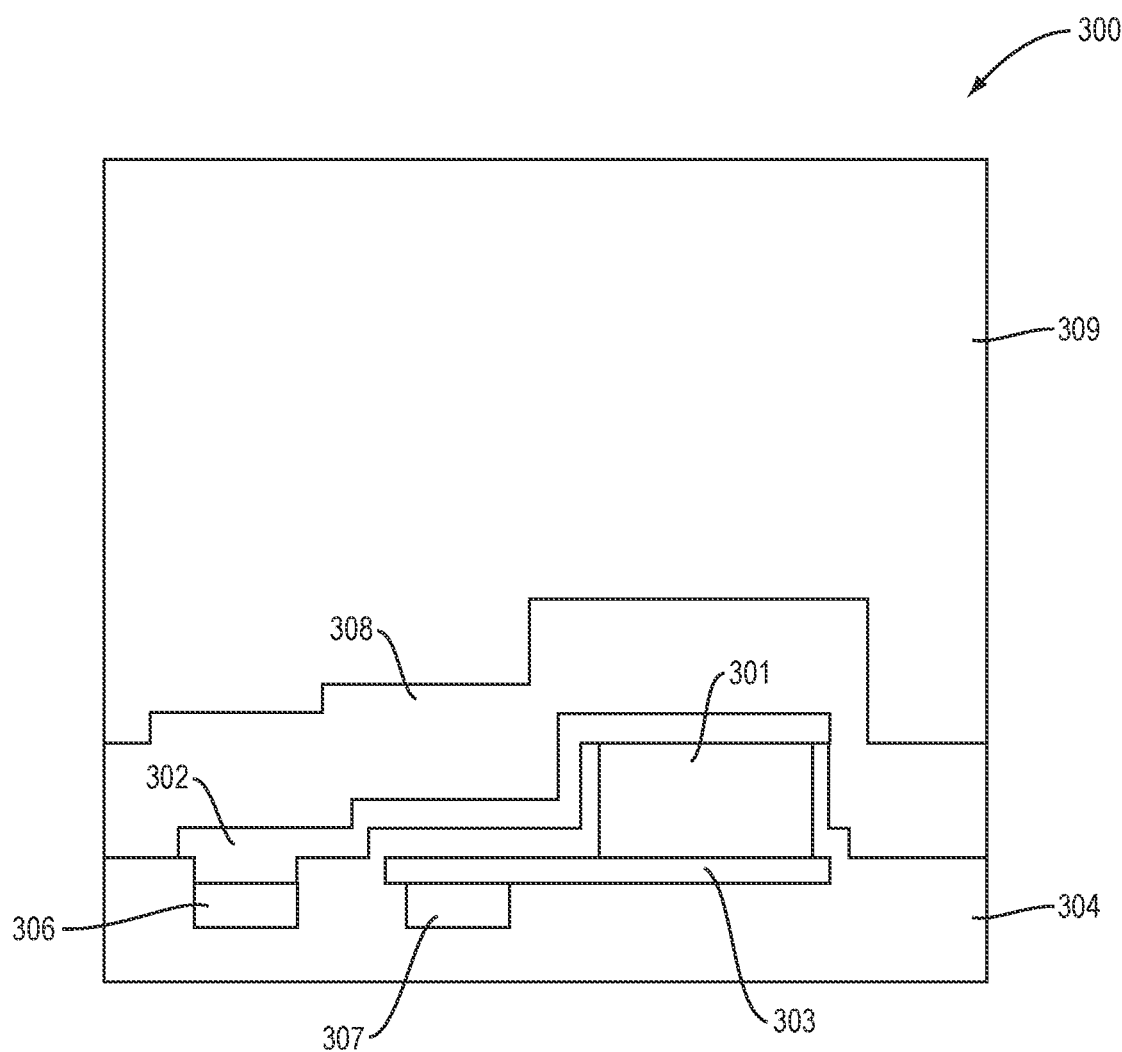
FIG. 3 is a cross-sectional view of a piezoelectric sensor.

FIG. 3 is a cross-sectional view of a piezoelectric sensor, in an illustrative implementation of this invention. The piezoelectric sensor 300 includes: (a) an aluminum nitride (AlN) piezoelectric element 301; (b) two molybdenum (Mo) electrodes 302, 303; (c) aluminum (Al) bonding pads 306, 307; (d) a silicon dioxide ($SiO_2$) layer 304; (e) a polyimide (PI) layer 308; and (f) a polydimethylsiloxane (PDMS) encapsulation layer 309.

This invention is not limited to piezoelectric sensors that comprise AlN; a wide variety of piezoelectric materials may be employed. For instance, piezoelectric material in each piezoelectric sensor in the sensor module may comprise: berlinite ($AlPO_4$), quartz, rochelle salt, topaz, tourmaline-group minerals, gallium orthophosphate ($GaPO_4$), langasite ($La_3Ga_5SiO_{14}$), barium titanate ($BaTiO_3$), lead titanate (Pb-$TiO_3$), lead zirconate titanate ($Pb[Zr_xTi_{1-x}]O_3$, $0<x<1$) (commonly referred to as PZT), lead magnesium niobate (PMN), lead magnesium niobate-lead titanate (PMN-PT), potassium niobate ($KNbO3$), lithium niobate ($LiNbO3$), lithium tantalate ($LiTaO3$), sodium tungstate ($Na2WO3$), zinc oxide (ZnO), sodium potassium niobate (($K,Na)NbO3$) (also known as KNN), bismuth ferrite ($BiFeO3$), sodium niobate ($NaNbO3$), bismuth titanate ($Bi4Ti3O12$), sodium bismuth titanate (NBT), polyvinylidene fluoride (PVDF), poly[(vinylidenefluoride-co-trifluoroethylene] [P(VDF-TrFE)3], or any combination of one or more of the forgoing.

This invention is not limited to PDMS encapsulation. Other elastomers may be employed to encapsulate a piezoelectric sensor. For instance, each piezoelectric sensor may be at least partially encapsulated with a thermoplastic elastomer, styrenic material, olefenic material, polyolefin, polyurethane thermoplastic elastomers, polyamide, natural rubber, synthetic rubber, PDMS, polybutadiene, polyisobutylene, poly(styrene-butadiene-styrene), polyurethane, polychloroprene, silicone or any combination of one or more of the foregoing. The elastomeric substrate may be a material with a low Young's modulus, for example less than 60 MPa, less than 50 MPa, less than 30 MPa, or less than 25 MPa.

The electrodes (e.g., 205) which electrically connect the piezoelectric sensors to bonding pads may comprise a wide range of flexible, electrically conductive materials. For instance, the electrodes may comprise silver (Ag), gold (Au), cobalt (Co), chromium (Cr), copper (Cu), iron (Fe), molybdenum (Mo), niobium (No), nickel (Ni), titanium (Ti), tungsten (W), zinc (Zn), zirconium (Zr), gold/titanium (Au/Ti) alloy, chromium/gold (Cr/Au) alloy, platinum/chromium (Pt/Cr) alloy, titanium/chromium (Ti/Cr) alloy, or any alloy or combination of the foregoing. These electrodes (e.g., 205) may be elastically deformable. For instance, in some cases, these electrodes may undergo strain of about 0.5%, 1%, 5%, 10%, 15%, 25%, 30%, 40%, 50%, or larger without fracturing. The piezoelectric sensors (e.g., 201, 202, 203, 204) and bonding pads (e.g., 206) may be more rigid than the electrodes (e.g., serpentine electrodes 205), but may still be elastically deformable themselves. For instance, the piezoelectric sensors and bonding pads may be sufficiently flexible to undergo elastic compression, elongation and/or twisting.

Figure 4:
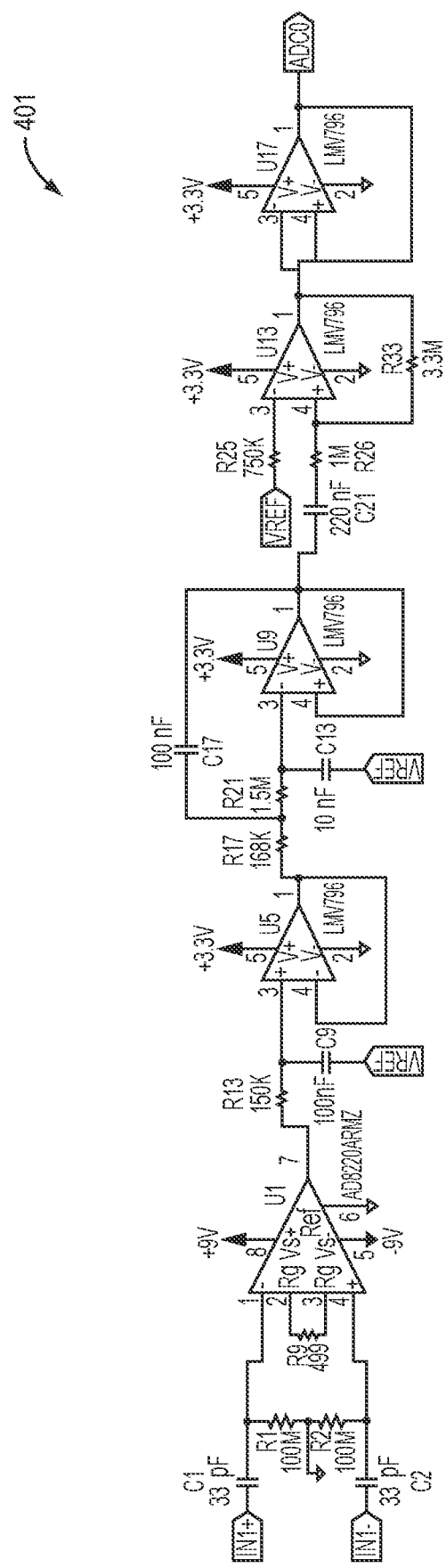
Figure 6:
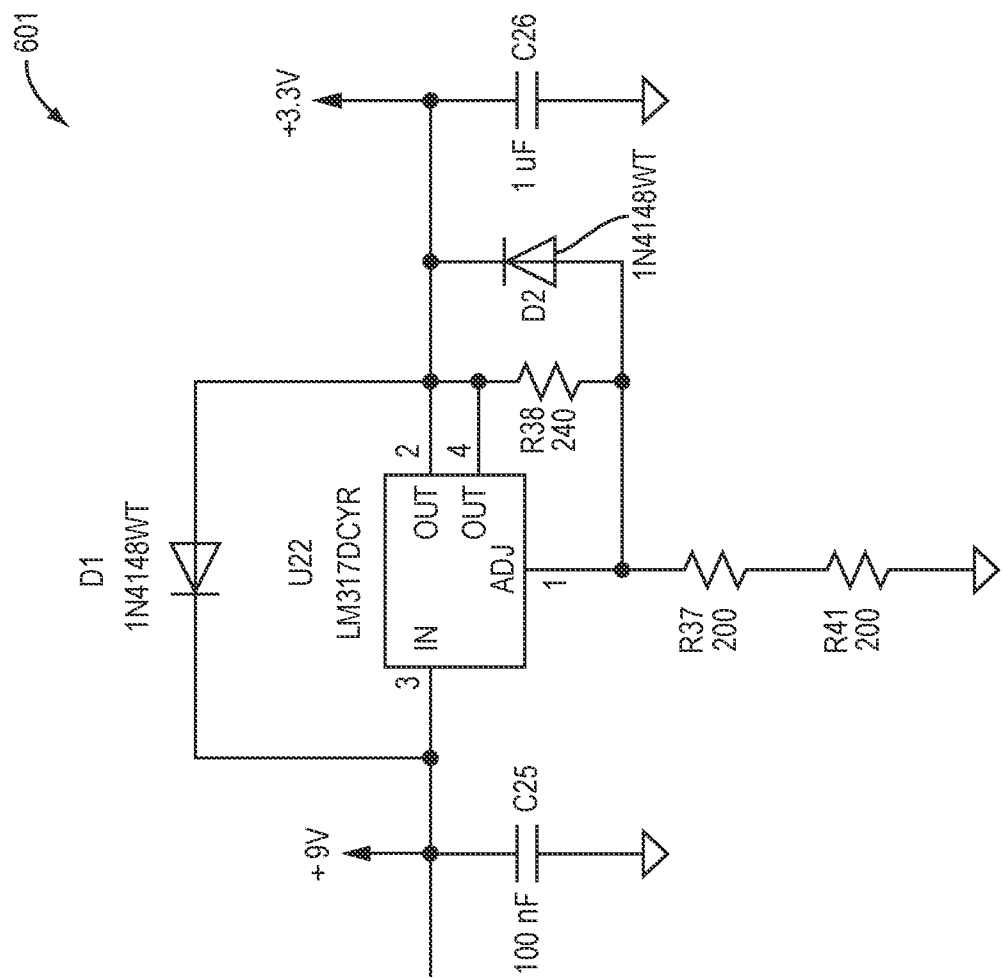
Figure 7A:
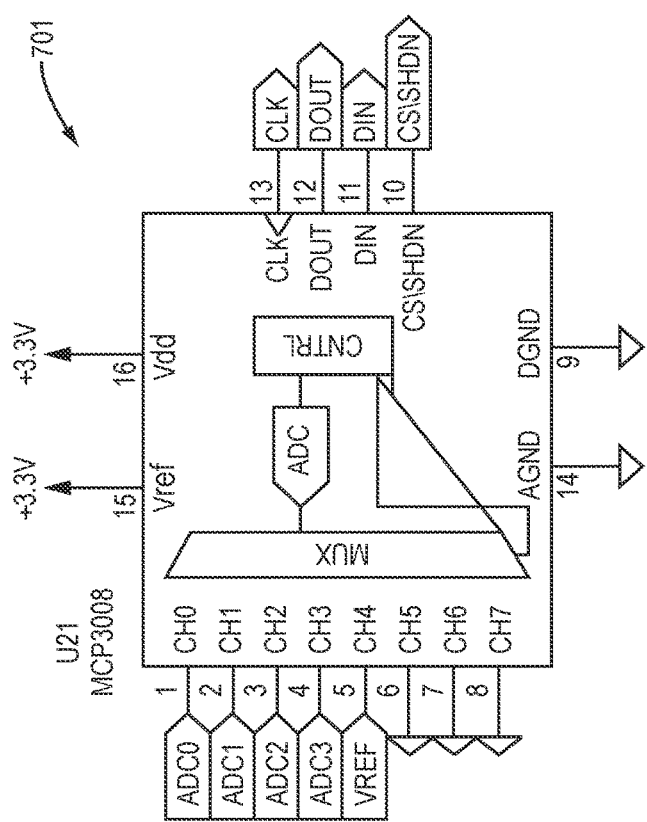
Figure 7B:
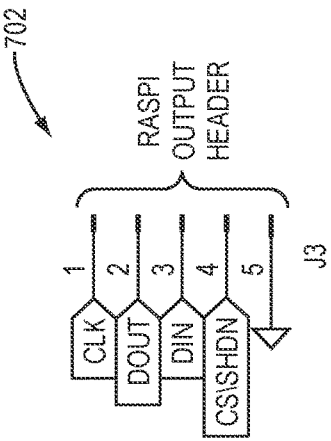

FIGS. 4, 5A, 5B, 5C, 6, 7A and 7B are each a schematic diagram which shows a circuit that is included in a piezoelectric sensor, in an illustrative implementation of this invention. FIG. 4 shows a differential voltage amplifier 401 that is employed to amplify an analog signal from a piezoelectric sensor. FIG. 5A shows a sensor input header 501 for receiving signals from a piezoelectric sensor. FIG. 5B shows a power input circuit 502, including batteries. FIG. 5C shows a circuit 503 for generating a reference voltage. FIG. 6 shows a power line generation circuit 601. FIG. 7A shows an ADC (analog-to-digital converter) circuit 701. FIG. 7B shows a circuit 702 for outputting signals to a Raspberry Pi® computer.

In some implementations of this invention, the sensor module has a low-elastic modulus and is conformable to facial skin on a user's face. These characteristics of the sensor module may be due to, among other things: (a) ultrathin active piezoelectric elements; (b) serpentine metal electrodes; and (c) a thin elastomer (PDMS, 40 μm-thick) substrate. The lateral configuration of the sensor module may comprise an array of AlN thin films, which demonstrate anisotropic growth of wurtzite crystal structure, patterned in circular shapes. The circular structures may enable localized spatiotemporal measurements of strain without directional bias. In some cases, each of the circular structures includes a layer of AlN (1.5 μm-thick, 0.48 cm diameter) sandwiched between two Molybdenum (Mo) electrodes (200 nm) and encapsulated with a 1 μm-thick layer of silicon dioxide ($SiO2$). The AlN layer and two molybdenum electrodes may together form a capacitor-type structure. The sensor module may have a simplified structure (e.g., 2×2 spatial array of piezoelectric elements) to reduce the amount of data processing during real-time decoding (and thus to lower computational load). The sensor module may achieve a response time fast enough (e.g., 5 ms) to track the changes in muscle motions. As noted above, in some cases, the piezoelectric sensors include aluminum nitride (AlN). This may be advantageous, because AlN may be lead-free (thereby avoiding the lead that occurs in lead-based piezoelectric materials, such as PZT).

In some cases, the sensor module may be applied conformally and securely to the skin with the use of a thin 3M® Tegaderm® medical tape (40 μm-thick) with an adhesion force of about 1.5N and adhesion strength of about 60 N/m and is stable over a wide temperature range, 25-65° C. In regions where the tape covers the sensor module, the tape may be farther from the skin than is the sensor module. The tape may touch the user's skin where the tape extends laterally beyond the edge of the sensor.

In some cases, the neutral mechanical plane (NMP) of each sensor is located within 110 nm of the midplane of the piezoelectric active layer. Applying tape over the sensor module (in order to temporarily attach the sensor module to facial skin) may shift the neutral mechanical plane only negligibly, maintaining it within the aforementioned range. This may enable each piezoelectric sensor in the sensor module to have a steady-state voltage output (when in a resting position before being deformed by a facial gesture) of approximately zero volts regardless of the initial curvature of the skin upon which it is placed. This in turn may facilitate using the sensor module to predictably measure facial strain in human users with a wide variety of facial shapes.

Machine Learning and Real Time Decoding

In some cases, the integrated system performs real-time decoding (RTD) and classification of facial deformations. The integrated system (including sensor module and computer(s)) may gather data to create a library of motions from which a large subset of human language can be inferred. The size of this subset may depend on the method of mapping facial motions to language as well as the number of distinct facial motions chosen for decoding. The number of motions chosen for decoding may depend on the number of phrases or ideas desired to be communicated as well as the chosen mapping strategy. For instance, different strategies for this mapping (e.g., direct, tree, conditional) may affect the total number of possible ideas or actions the user may communicate using a particular set of motions. A motion library may be created for each user, based on that user's preferences and comfort. Each motion may be classified as one of the motions in the library via a real-time decoding (RTD) algorithm, which may use a dynamic-time warping, k-nearest neighbors (kNN-DTW) model. The kNN-DTW algorithm may predict the most likely motion based on calculating the distance between each of the voltage waveforms detected during testing and all the detected waveforms in the training set for the model. The motion classification may rely on calculating the distance between sets of voltage waveforms from two motions. The kNN-DTW algorithm may effectively compare the voltage waveform shapes rather than voltage values or principal components. For each detected motion, n voltage waveforms may be captured, each one corresponding to a particular sensing element of the sensor module. Distances $d_i$ between the voltage waveforms corresponding to the same element i are calculated, and the r.m.s. (root mean square) value may then be calculated to obtain the total distance $$d = \sqrt{\sum_{i=1}^{n}(d_i)^2},$$

between an observed signal and a signal in the training set, where n is total number of sensing elements. Each distance $d_i$ may be calculated with DTW (dynamic time warping). For each instance, each distance $d_i$ may be calculated as an approximation for DTW which coarsens temporal resolution of the voltage waveform, computes a warped distance matrix between two signals at that lower resolution, and projects that matrix back into finer resolution. Once the total distance between the detected motion and each of the motions in the training set is calculated, the k nearest neighbors (e.g., voltage waveform sets with the k lowest total distances) may be identified and their motion labels may be used to determine the weighted-average probabilities of each motion label. The motion with the highest probability may be dubbed the "classification" of the detected motion.

In some cases, a sensor module (with multiple piezoelectric sensors) performs RTD (real-time decoding). The sensor module may be laminated on facial skin and connected to a signal-processing board (SPB) that performs differential voltage amplification, analog signal filtering, and analog-to-digital conversion. The output of the SPB may be connected to a Raspberry Pi® (RPi), for portable applications. The onboard processor on the RPi may run the kNN-DTW algorithm code files, which may be written in the Python® software language.

In some cases, to train the machine learning algorithm (MLA), the sensor is placed on the user's face. The user may be instructed to make various facial movements (e.g., ten different expressions). While the user makes these facial movements, voltage readings may be taken. These voltages may be labeled with the facial expressions, and fed as training data into the MLA. In a prototype of this invention, a kNN DTW (k-nearest-neighbor with dynamic time warping) algorithm is employed for RTD (real-time decoding). Alternatively, other machine learning algorithms may be employed instead of, or in addition to, kNN-DTW.

In some cases, in order to train a machine learning algorithm, a human subject completes a training session which involves performing each motion type, in a set of motion types, multiple times. As a non-limiting example, in this training session, each movement type may be performed 12 times. Data regarding each motion type may be labeled for training purposes. For each motion type in the set, a four-second interval containing the motion-induced voltage output (100 Hz sampling rate) of the sensor may be detected, stored, and filtered digitally using a 6th order low-pass Butterworth filter with 6 Hz cutoff frequency. This may be repeated for each distinct motion type in a user's desired library, and may form a calibration set. The human subject may then perform a series of motions which are classified in real-time using the kNN-DTW algorithm Advantageously, the kNN-DTW algorithm allows for classification even when the voltage waveforms for a given motion label are shifted in time or warped (e.g., because the motion is performed slower or faster).

However, this invention is not limited to using a kNN-DTW algorithm for real-time decoding. A wide variety of machine learning algorithms may be used instead of, or in addition to, kNN-DTW, to classify facial gestures based on measurements of mechanical strain of facial skin. For instance, the one or more machine learning algorithms may comprise one or more: regression algorithms (e.g. linear regression); instance-based algorithms (e.g. k-nearest neighbors, kernel machines, or radial basis function algorithms); regularization algorithms (e.g. ridge regression); decision tree algorithms; Bayesian algorithms (e.g. naive Bayes, Gaussian naive Bayes, multinomial naive Bayes, or Bernoulli naive Bayes); clustering algorithms (e.g. k-means); random forests algorithms; ANNs (artificial neural networks); CNNs (convolutional neural networks); RNNs (recurrent neural networks); RNNs with LSTM (long short term memory) algorithms; RNNs with Gated Recurrent Unit; MLPs (multi-layered perceptrons); SVMs (support vector machines); deep learning algorithms; ensemble machine learning algorithms; reinforcement learning algorithms (such as a Monte Carlo, Q-learning, state-action-reward-state-action, or deep Q network algorithm); AEs (auto-encoders), SAEs (stacked auto-encoders) VAEs (variational auto-encoders), DBNs (deep belief networks), GANs (generative adversarial networks), conditional GANs, infoGANs; or restricted Boltzmann machines. The one or more machine learning algorithms may perform supervised or unsupervised learning. In some cases, the one or more MLAs perform deterministic or stochastic gradient descent. The one or more MLAs may classify voltage waveforms that are outputted by piezoelectric sensors when these sensors measure mechanical strain of a user's facial skin that occurs while the user makes a facial gesture. In some cases, other feature extraction algorithms such as principal component analysis, nonlinear dimensionality reduction, multilinear subspace learning, semidefinite embedding, and/or autoencoders, may be used for extracting the features used to compare voltage waveforms resulting from different motions.

In some cases, the integrated system detects and decodes facial expressions such as: blink; eyebrow down medium magnitude; eyebrow down small magnitude; eyebrow up medium magnitude; eyebrow up small magnitude; saying vowel "A," "E," "I," "O," and "U," respectively; open mouth; pursed lips; smile medium magnitude; smile small magnitude; twitch medium magnitude; and/or twitch small magnitude.

Calibration, Generally

As noted above, during an initial calibration step, a user may make facial gestures while: (a) an array of cameras captures a time series of images of these gestures from different angles; and (b) a piezoelectric sensor module takes spatiotemporal measurements of mechanical strain of facial skin of a user's face. The images captured by the cameras may be analyzed in order to determine the mechanical strain caused by the gestures. For instance, a computer may analyze the images using stereophotogrammetry and 3D-DIC. A computer may predict the voltage waveforms (outputted by the piezoelectric sensor module) that would occur due to the mechanical strain measured in the camera images. A computer may compare the actual voltage (measured by the sensor module) and the predicted voltages (predicted based on the strain measured in the images captured by the cameras). If the actual and predicted voltages are sufficiently close to each other, the computer may validate the sensor module; otherwise, the computer may determine that the sensor module is too inaccurate to be used.

Also, as noted above, the strain maps calculated from the camera images (using stereophotogrammetry and 3D-DIC) during calibration may be employed to select the position and orientation of the sensor module.

Figure 8:
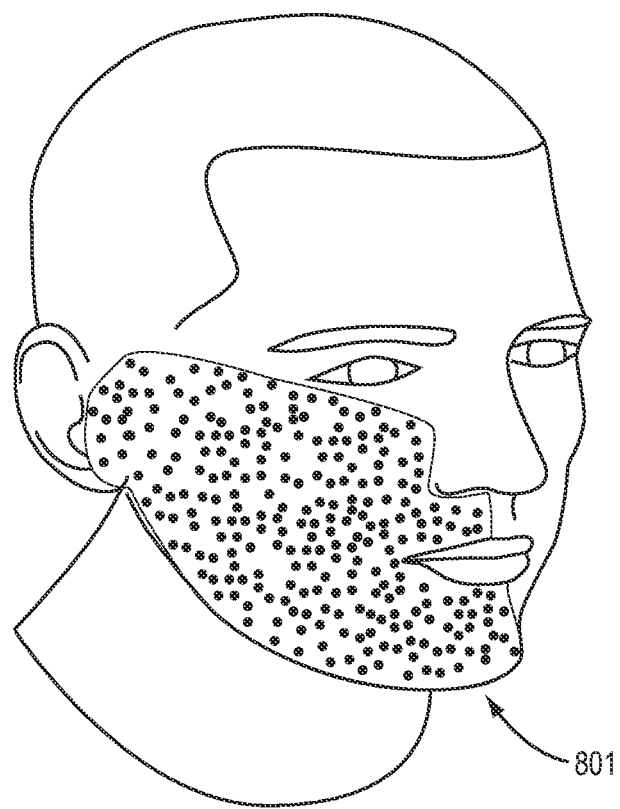
FIG. 8 shows a pattern of dots applied to a user's face.

FIG. 8 illustrates using a pattern of dots applied to a user's face, in an illustrative implementation of this invention. These dots may function as visual fiducial markers to facilitate visual measurements of mechanical strain of facial skin. In the example shown in FIG. 8, a sensor module has been taped to skin on a user's cheek. Makeup has been applied over the tape. Then a random pattern of dots 801 has been applied over the makeup.

Figure 9:
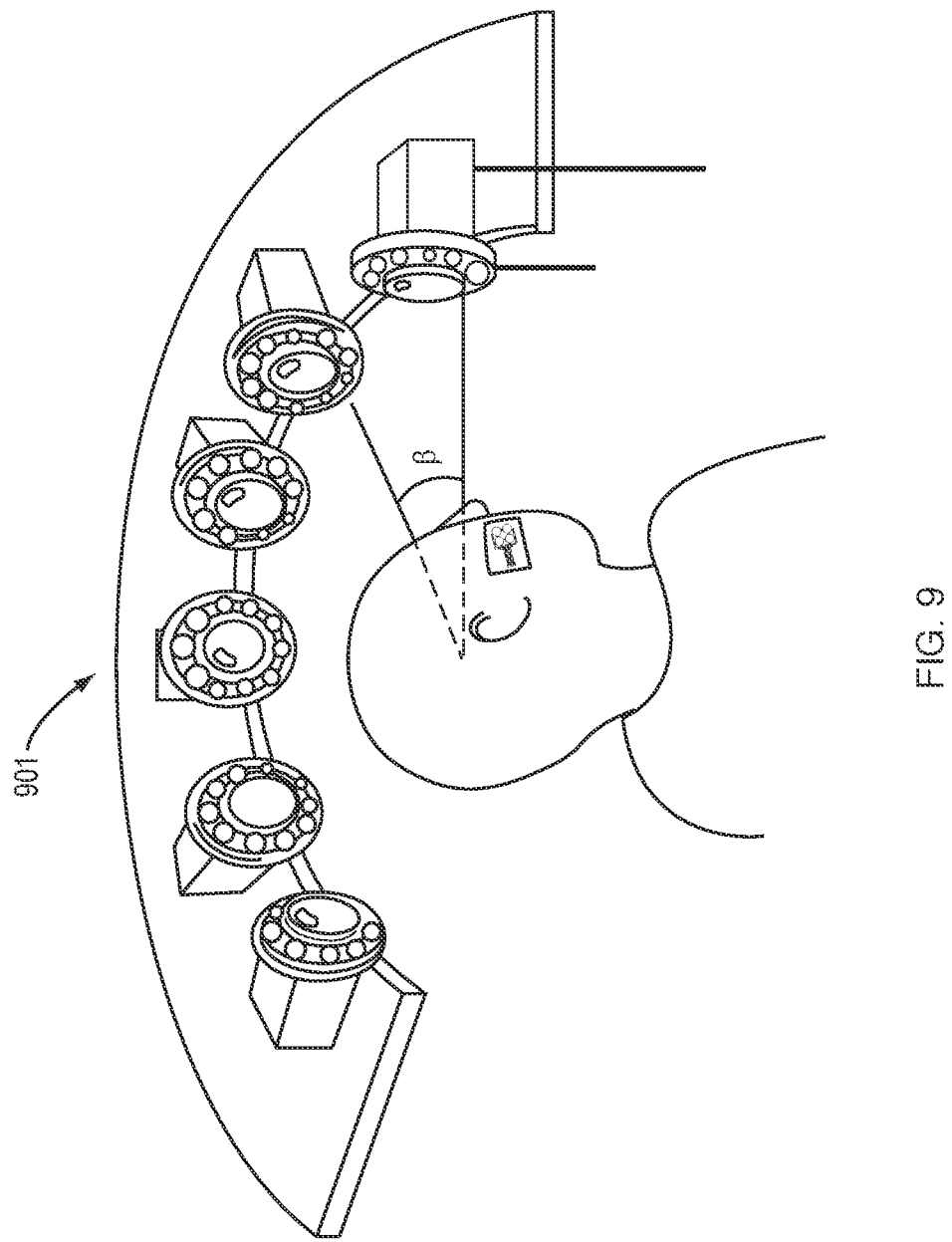
FIG. 9 shows an array of cameras that captures digital images of movements of a user's face.

FIG. 9 shows an array of cameras 901 that captures digital images of movements of a user's face. The cameras in the array are positioned at different vantage points in such a way that each camera in the array images the user's face from a different angle. For instance, in some cases, the cameras are spaced apart at equal angular distances (e.g., with the same angle β between each pair of neighboring cameras in the array). The images captured by the array of cameras may be employed for stereophotogrammetry and DIC calculations.

In some cases, local deformation signatures resulting from different facial motions may be predicted based on voltage waveforms outputted by the piezoelectric sensor module.

Buckling of Piezoelectric Beams

The buckling of piezoelectric beams may be modeled as:

$$m\frac{\partial^2 w}{\partial t^2} + c\frac{\partial w}{\partial t} + EI\frac{\partial^4 w}{\partial x^4} + \left[P - \frac{EA}{2L}\int_0^L \left(\frac{\partial w}{\partial x}\right)^2 dx\right]\frac{\partial^2 w}{\partial x^2} + \alpha\left[\frac{d\delta(x)}{dx} - \frac{d\delta(x-L)}{dx}\right]V(t) = 0,$$ (Equation 1)

where m is the total mass per unit length of the beam, w(x,t) is deflection along the z-axis, EI is the equivalent bending stiffness of the composite beam, P is the axial load applied by the material testing system, EA is the equivalent axial stiffness of the beam, L is the length of the beam, α is the piezoelectric coupling coefficient, δ(x) is the Dirac delta function, and V(t) is the voltage across the piezoelectric element.

If the width of the beam is denoted by b, the thickness of the substrate by $t_s$, the thickness of the piezoelectric layer by $t_p$, and the transverse piezoelectric coefficient by $e_{13}$, the piezoelectric coupling coefficient may be computed as $$\alpha = 2be_{13}\frac{t_s + t_p}{2}.$$

The continuous equations of motion may be discretized using the assumed-mode method, and the buckling mode shapes may be taken to be the same as the vibration mode shapes of a pinned-pinned beam. The fundamental mode shape of the simply supported beam may be modeled as $$\phi(x) = A\sin\left(\frac{\pi x}{L}\right),$$

and the deflection of the beam may be written as a function separable in space and time, w(x,t)=ϕ(x)T(t). The differential equations for the vibrations of the first mode of coupling may be written as:

$$\begin{cases} M\ddot{T} + c\dot{T} + (K-p)T + NT^3 + \beta V(t) = 0 \\ C_0\dot{V} + \frac{V}{R} = -\beta\dot{T} \end{cases}$$ (Equation 2)

where the reduction of the stiffness coefficient due to the axial force is $$p = -P\int_0^L \phi\phi dx = AP^2\frac{\pi^2}{2L},$$

the nonlinear coefficient is $$N = -\frac{EA}{2L}\int_0^L (\dot\phi)^2 dx \int_0^L \ddot\phi\phi dx = A^4 EA\frac{\pi^4}{8L^3},$$

the coupling coefficient is $$\beta = \alpha[\dot\phi(0) - \dot\phi(L)] = -2\alpha A\frac{\pi}{L},$$

and the total capacitance of the piezoelectric layer is $$C_0 = 2\frac{\epsilon_0 bL}{t_p}.$$

In this mathematical model: If the axial force is larger than the critical force, which leads to buckling, then p will be larger than K, and according to Lyapunov stability theory, in that situation, the zero deflection equilibrium becomes unstable. This condition, however, creates two new static equilibrium points located at $$T = \pm\sqrt{\frac{p-K}{N}}.$$

The deflection of the beam results in the decrease of its length. If the uniform axial deformation is neglected compared to the geometric effects, the shortening of the beam is $$u = \int_0^L \frac{1}{2}\left(\frac{\partial w}{\partial x}\right)^2 dx = \frac{(AT(t))^2 \pi^2}{4L}.$$

The differential equations in Equation 1 may be used when the axial load is controlled or known; however, in some of the tests, the axial displacement is controlled instead, for which a modified equation may be used, as discussed below.

The mathematical model of buckling described in the preceding four paragraphs is a non-limiting example of how buckling may be modeled mathematically.

Modeling Voltage

The piezoelectric elements in the sensor module may transform mechanical energy into electrical energy. Thus, the observed voltages may be used to predict the strains expected from the measurements of the top surface deformation of the sensor when laminated on the skin. Assuming the sensing element area is small enough that the strain is constant over the area of each sensor element, we may write the following analytical expression for the sensor voltage:

$$C\frac{dV}{dt} + \frac{V}{R} = e_{31} A \frac{d}{dt}(\epsilon_1 + \epsilon_2) \qquad \text{(Equation 3)}$$

where C is the capacitance of the sensor, R is the shunt resistance of the DAQ (digital acquisition) system, $e_{31}$ is the effective piezoelectric stress coefficient, A is the area of the piezoelectric element, $\epsilon_1$ and $\epsilon_2$ are the strains in the two principal strain directions and $\epsilon_1+\epsilon_2$ represents the trace of eigendecomposed strain tensor, and out-of-plane strain $\epsilon_3$ is immeasurable and assumed negligible for this calculation.

(A note on terminology: In this document, we follow the convention that the first principal strain is the minimal in-plane strain, the second principal strain is the maximal in-plane strain occurring in an orthogonal direction, and the third principal strain, or out-of-plane strain, is immeasurable. As used herein, "in-plane" means in a plane that is locally tangent to the skin's surface).

The facial gestures may involve shear strains, evident from the appearance of wrinkle lines during some deformations. The buckling showcased by the wrinkles may indicate compressive strain normal to the wrinkles and tensile strains along the wrinkles. A combination of compressive and tensile shear strains may create notable shear strains in the non-principal directions. The shear strains may be zero if the coordinate axes are chosen along the strain directions. The principal directions may, however, change in time and thus we derive our equations along a global coordinate system. Shear strains do not affect the generated voltage modeled in Equation 3, since the coupling coefficient between the shear strain in the X-Y plane and electrical displacement in the Z axis is zero. A non-zero coupling coefficient associated with shear deformation is $d_{15}$, which involves shear deformation along X-Z plane and may be measured with electrodes on the lateral surfaces (normal to the X axis).

The voltage output of the sensor module, which may have electrodes in the Z direction, may correlate with the sum of the planar normal strains, or the surface strain tensor trace $\varepsilon_s$, which represents the 3D-DIC-measured value of $\epsilon_1+\epsilon_2$ from Equation 3. To estimate $\varepsilon_s$ from the sensor module-generated voltage, the following transfer function may be employed:

$$\frac{\epsilon_1(\omega) + \epsilon_2(\omega)}{V(\omega)} = \frac{1}{R\kappa j\omega},$$

where $\kappa$ is the piezoelectric coupling coefficient evaluated from FEM simulations.

This transfer function may be used to predict the strain on the top layer of the sensor module plus Tegaderm® tape when the piezoelectric voltage output is known.

3D-DIC

During calibration, an array of cameras may capture videos of a user's face while a user performs facial gestures. The videos may be analyzed to make reliable, non-contact, full-field spatiotemporal estimates of surface strains with and without the sensor module laminated on the epidermal region of interest. When an object, such as the human face, is positioned in view of a set of cameras—such that each pair of two adjacent cameras has an overlapping field-of-view (FOV) of the object—the cameras may reliably capture images of the object's movements. For instance, the images may have 12-bit resolution and may be captured at a rate of 6 frames per second (fps). If the object is speckled with a random pattern of dots and then undergoes deformation during this image capture, the resulting images may be analyzed using three-dimensional digital image correlation (3D-DIC) software. For instance, the 3D-DIC software may employ the MATLAB® MultiDIC software toolbox. Using the 3D-DIC software and the captured images, a computer may accurately reconstruct the surface of the object in 3D space and track the strain field across that surface during movements. Sets of images collected from both a cylindrically-shaped calibration object and a flat checkerboard distortion correction object may be utilized to derive the intrinsic and extrinsic camera parameters (e.g., focal lengths, principal point coordinates, radial and tangential distortion parameters, and skew parameters, position and orientation of the camera with respect to the global coordinate system) through both direct linear transformation (DLT) and bundle adjustment (BA) methods. The determined DLT parameters and BA parameters may then be used to map two-dimensional (2D) image points of the calibration object into 3D space and calculate the reconstruction errors, which result from a variety of sources, such as image quality, focus, and lighting.

The 3D-DIC computations may include analysis of pairwise images to detect matching image points and calculate their correlation coefficient, a parameter describing the degree of "matching" of the speckles on the object of interest as seen from two adjacent cameras (spatially) and as they move over time (temporally). Correlation coefficients may be computed using an NCorr algorithm. The NCorr algorithm is a two-dimensional digital image correlation (2D-DIC) algorithm which defines a correlation cost function for which a lower degree of matching equates to a higher correlation coefficient. After the correlation process using NCorr, 3D reconstruction may be performed, followed by strain calculations. These calculations may output a spatiotemporal full-field estimate of strain across the surface of the object of interest. Each pair of cameras may produce a triangular mesh created from the 3D point cloud resolved from 3D reconstruction of 2D image points. Full-field displacements, deformations, and strains may then calculated from the temporal changes in the 3D coordinates of the triangular mesh from each pair using a variation of the triangular Cosserat point element method. The eigendecomposition of the local Lagrangian strain tensor may provide principal strain directions and magnitudes on each local surface element comprising the triangular mesh. In some cases, the 3D-DIC computations are performed only once for any given user, during calibration for that user.

System calibration (using direct linear transformation, or DLT) and distortion correction (using bundle adjustment, or BA) may be performed to characterize the optical system (of multiple cameras) and determine appropriate camera parameters.

In DLT, the image point coordinates $I(x_p, y_p)$ may be mapped to the 3D positions of the dots on the cylindrical calibration object $s(X,Y,Z)$, which are known with high accuracy, via a set of DLT parameters ($L_j$=1, 2, ..., 11) as shown in Equation S1.

$$x_p = \frac{L_1 X + L_2 Y + L_3 Z + L_4}{L_9 X + L_{10} Y + L_{11} Z + 1} \quad \text{(Equation S1)}$$

$$y_p = \frac{L_5 X + L_6 Y + L_7 Z + L_8}{L_9 X + L_{10} Y + L_{11} Z + 1}$$

In BA, nonlinear lens distortion correction replaces idealized image point coordinates (x,y) with distorted normalized coordinates ($x_d$, $y_d$) through a set of radial ($k_1$, $k_2$, $k_3$) and tangential ($p_1$, $p_2$, $p_3$) distortion parameters, as shown in Equation S2.

$$\begin{bmatrix} x_d \\ y_d \end{bmatrix} = (1 + k_1 r^2 + k_2 r^4 + k_3 r^6) \begin{bmatrix} x \\ y \end{bmatrix} + \begin{bmatrix} 2 p_1 xy + p_2(r^2 + 2x^2) \\ p_1(r^2 + 2y^2) + 2 p_2 xy \end{bmatrix} \quad \text{(Equation S2)}$$

where $r^2 = x^2 + y^2$.

These parameters may be determined through analysis of images of the distortion calibration flat checkerboard object taken with the DIC setup.

In some cases, a computer performs computations to match images from two adjacent cameras and across two images taken at different times. This matching is helpful to achieve accurate full-field strain calculations from 3D reconstructed points. The 2D DIC methods involved in calculating correlation coefficients, therefore, may precede 3D reconstruction. 2D DIC may be computed using open source MATLAB® software NCorr, which may match corresponding points on stereo images of the speckled object and may be repeated for every stereo pair at every time step. Ncorr may employ a first order shape function to describe pixel subset transformations across two images. It may further define the least-square correlation criterion as a correlation cost function, using the Inverse Compositional Gauss-Newton method as a nonlinear optimizer, and using the Reliability-guided method to propagate the analysis over the region of interest (ROI), the common area viewable from both cameras in a stereo pair, starting from user-defined seed points. In MultiDIC's wrapper for Ncorr, a triangular mesh may be defined on the point grid and used for the 3D reconstruction step.

At each timestep, 3D reconstruction may use the DLT parameters $L_j^{C_k}$ and $L_j^{C_l}$, j=0, 1, 2, 11 associated with cameras $C_k$ and $C_l$ in a stereo pair to reconstruct each pair of corresponding, or matching, points ($x_p^{C_k}, y_p^{C_k}$) and ($x_p^{C_l}, y_p^{C_l}$) from the two cameras, as determined by the 2D DIC in the prior step, to 3D coordinates (X, Y, Z), with $\vec{U} = A\vec{P}$, where $$\vec{U} = \begin{bmatrix} x_p^{C_k} - L_4^{C_k} \\ y_p^{C_k} - L_8^{C_k} \\ x_p^{C_l} - L_4^{C_l} \\ y_p^{C_l} - L_8^{C_l} \end{bmatrix}, \vec{P} = \begin{bmatrix} X \\ Y \\ Z \end{bmatrix}, \text{ and} \quad \text{(Equation S3)}$$

$$A = \begin{bmatrix} L_1^{C_k} - L_9^{C_k} x_p^{C_k} & L_2^{C_k} - L_{10}^{C_k} x_p^{C_k} & L_3^{C_k} - L_{11}^{C_k} x_p^{C_k} \\ L_5^{C_k} - L_9^{C_k} y_p^{C_k} & L_6^{C_k} - L_{10}^{C_k} y_p^{C_k} & L_7^{C_k} - L_{11}^{C_k} y_p^{C_k} \\ L_1^{C_l} - L_9^{C_l} x_p^{C_l} & L_2^{C_l} - L_{10}^{C_l} x_p^{C_l} & L_3^{C_l} - L_{11}^{C_l} x_p^{C_l} \\ L_5^{C_l} - L_9^{C_l} y_p^{C_l} & L_6^{C_l} - L_{10}^{C_l} y_p^{C_l} & L_7^{C_l} - L_{11}^{C_l} y_p^{C_l} \end{bmatrix}.$$

The 3D coordinate $\vec{P}$ may then be calculated as the least squares solution $\vec{P} = [A^T A]^{-1} A^T \vec{U}$. This procedure may be repeated for all stereo pair images for all timesteps, thereby resulting in 3D point clouds which form surfaces and capture the motion of points on the object over time.

The 3D coordinates calculated in the previous step may define the vertices of a triangular mesh surface. The triangular mesh defined at time t=0 may be set as the reference configuration, and the meshes at each subsequent timestep may be the deformed configurations. As such, strain may be assumed to be zero at time t=0 and the triangular mesh coordinates at each time point may be used to derive the full-field displacement, deformation, and strain. For each triangular element and for each configuration, the deformation gradient tensor F may be calculated using a variation of the triangular Cosserat point element method[44,45]. Assuming each element is characterized by a homogeneous deformation field, this method may obtain the finite (nonlinear) deformation field with the same spatial resolution as the DIC measurement, and independently from adjacent data points and numerical derivatives. For instance, Green-Lagrangian strains may computed. The Green-Lagrangian strain tensor E is defined as $$E = \frac{1}{2}(C - I),$$

where $C = F^T F$.

The neutral mechanical plane may be calculated using the following equation:

$$y_{neutral} = \frac{\sum_{i=1}^{n} \bar{E}_i t_i \left( 2 \sum_{j=1}^{i} t_j - t_i \right)}{2 \sum_{i=1}^{n} \bar{E}_i t_i}, \quad \text{(Equation S4)}$$

where $\bar{E}_i$ and $t_i$ are the plane-strain modulus and thickness of the i$^{th}$ layer, respectively, and $$\bar{E}_i = \frac{E_i}{(1 - v^2)},$$

where $E_i$ is the Young's modulus and $v_i$ is the Poisson ratio of the i$^{th}$ layer.

The differential equations in Equation 1 may be used when the axial load is controlled or known; however, in some of the tests, the axial deformation is controlled instead, for which the following governing equation may be used:

$$m\frac{\partial^2 w}{\partial t^2} + c\frac{\partial w}{\partial t} + \quad \text{(Equation S5)}$$
$$EI\frac{\partial^4 w}{\partial x^4} + \left[\frac{EA}{L}\Delta + P_c - \frac{EA}{2L}\int_0^L \frac{\partial w}{\partial x}dx\right]\frac{\partial^2 w}{\partial x^2} +$$
$$\alpha\left[\frac{d\delta(x)}{dx} - \frac{d\delta(x-L)}{dx}\right]V(t) = 0,$$

where the critical load is denoted by $P_c$.

Equation S5 may also be discretized using the assumed mode method, and the governing equation for the system may become:

$$\begin{cases} M\ddot{T} + c\dot{T} + (K - p_e)T + NT^3 + \beta V(t) = 0 \\ C_0\dot{V} + \frac{V}{R} = -\beta\dot{T} \end{cases} \quad \text{(Equation S6)}$$

where the equivalent compressive force $$p_e = A\left(\frac{EA}{L}\Delta + P_c\right)^2 \frac{\pi^2}{2L}.$$

During compression, the sensor module may be loaded along the thickness direction. The sensor module, which has multiple layers, may be modeled with the layers acting like different springs in series.

The vibrations of a piezoelectric disk vibrating in the thickness direction may be estimated by assuming that the first mode is the only active vibration mode. For this estimation, the unimodal mechanical and electrical equations of motion are $$\frac{d^2u}{dt^2} + 2\zeta\omega_n\frac{du}{dt} + \omega_n^2 u - d_{33}\omega_n^2 V = \frac{F}{m_{eq}} \quad \text{(Equation S7)}$$
$$C\frac{dV}{dt} + \frac{V}{R} + m_{eq}d_{33}\omega_n^2\frac{du}{dt} = 0,$$

where u is the deformation of the disk, $\zeta$ is the damping ratio, $\omega_n$ is the natural frequency of the first mode, $d_{33}$ is the piezoelectric coefficient, v is the voltage, $m_{eq}$ is the equivalent modal mass for the first mode, F is the external force, the capacitance of the piezoelectric layer is C, and the shunt resistance is R (the shunt resistance in this context being the internal resistance of the DAQ system).

The above equations may be simplified one step further by neglecting the inertial and damping terms in comparison to the stiffness term. In the frequency domain, the mechanical equation of motion becomes:

$$-\omega^2 u(\omega) + 2j\zeta\omega_n u(\omega) + \omega_n^2 U(\omega) - d_{33}\omega_n^2 V(\omega) = \frac{F(\omega)}{m_{eq}}. \quad \text{(Equation S8)}$$

When the excitation frequency $\omega$ is small, the first (inertial) and second (damping) terms may be negligible compared to the other terms and may be ignored. This simplifies the governing equations to:

$$\begin{cases} u - d_{33}V = \frac{F}{k_{eq}} \\ C\frac{dV}{dt} + \frac{V}{R} + k_{eq}d_{33}\frac{du}{dt} = 0 \end{cases}, \quad \text{(Equation S9)}$$

where $k_{eq}$ is the equivalent stiffness of the first mode and is equal to $\omega_n^2 m_{eq}$.

The simplified equations may be numerically integrated in time to identify the response of the piezoelectric sensor to the compressive excitation in the thickness direction.

FEM Modeling

As another method of theoretical prediction, full three-dimensional multi-physics modeling via COMSOL® software may be used to generate an FEM (finite element method) model of a multi-layer sensor. Both analytical and FEMs models may accurately predict the mechanical behavior and voltage output of the piezoelectric sensor module accurately. The accurate prediction of the analytical model may stem from its accounting of the geometric nonlinearities of the post-buckled beam, indicating that the single-mode model is an accurate approximation of the piezoelectric sensor even in a fully nonlinear testing situation. For example, during certain motions, such as pursed lips (PL), the cheek skin may pucker inward due to stretching of skin over an internal mouth cavity. During stretching of skin during facial gesture, there may occur some low-amplitude concave buckling, which results in voltage waveforms different from that of convex buckling.

The extent of nonlinearities resulting from axial loading of the sample may scale with the amplitude of mechanical excitation. A bare sensor may buckle under axial loads of less than Laminating the sensor module on a sample of 2-mm thick skin, however, may increase the critical buckling load of the system and thus may change the voltage response of the sensor module. At low levels of excitation, the beam motion may involve an impulse both at the moment of application of the buckling load as well as at its removal, but at larger values of axial deformation, the impulse at the point of force removal may disappear. Uniaxial stretching deformations may cause significant axial tension in the sample.

After lamination of the sensor module on the skin, the strain measured by the DIC method is not that of the skin. Instead, the measured strain is the strain at the top of the Tegaderm® tape securing the sensor module to the skin. In a prototype of this invention: (a) the strain at the top surface of the sensor is an order of magnitude smaller than that at the top of the skin; and (b) thus the change in DIC-measured strain when the sensor module is laminated on the skin does not imply that the skin deformations have changed.

Sensor Placement

Furthermore, 3D-DIC results without the sensor may be utilized to determine a sensor placement location in such a way that the piezoelectric elements of the sensor module experience computationally distinguishable epidermal deformation signatures, i.e. spatiotemporal strain profiles, during distinct motions for an individual. This is useful for real-time decoding (RTD), in which the sensor may be placed such that each motion may be uniquely identified by the measured voltages in each sensing element. In some cases: (a) the sensor module remains laminated in the same location during the occurrence of different facial motions; and (b) the sensor module is positioned on the user's face in such a way as to is to maximally differentiate the voltage waveforms generated by the multiple piezoelectric elements of the sensor module.

Once an optimal location for a sensor module has been determined, it may be desirable to put the sensor module in this same position each time that the sensor module is re-applied to the face (e.g., after waking up, or after taking a shower)

In some implementations of this invention, a device that we sometimes call an "alignment scaffold" or "scaffold" is used to position the sensor module in the same place on a user's face, each time that the sensor module is applied to the face. The alignment scaffold may be a piece of fabric with edges that are aligned with points on a user's face (e.g., nose and chin). The scaffold may have a hole in it. The sensor module may be placed in the hole. Pressure-sensitive tape may be applied to the scaffold to help hold the sensor module to the scaffold, but the sensor module may still be easily removed from the scaffold.

Here is a non-limiting example of creating an alignment scaffold and then using it to laminate a sensor module on the same location of the facial skin over multiple sessions of lamination and delamination. The subject's face may be prepared to be free of lotions, creams, and oils. Then, a low-stretch fabric may be held in place over the region of interest on the face upon which the sensor is to be placed. The fabric may be fitted over facial features such as the chin and nose. A thin marker may be used to outline key features of the face, such as corners of the ear, nose, mouth, and eye, which may be used to re-align the fabric. The fabric may be cut along the drawn lines and checked for alignment with facial features. Then, a 3 cm×5 cm area may be outlined and cut out of the fabric. This location may be where the sensor module and Tegaderm® tape is placed. Two pieces of clear, pressure-sensitive tape may be placed on the short sides of the cut-out rectangle to achieve adhesion with Tegaderm® tape. For instance, a pressure-sensitive tape with relatively low adhesion force to the non-sticky side of Tegaderm® tape may be employed for this purpose. The preceding steps may create the alignment scaffold. The sensor may then be placed on Tegaderm® tape's sticky side and the non-sticky side of Tegaderm® tape may be adhered onto the sticky side of the alignment scaffold and prepared for attachment to the face. The alignment scaffold with the sensor module attached may be laminated on the face, starting from one edge and making sure that all previously marked key features are aligned. Subsequent removal of the alignment scaffold may leave the sensor module laminated on the skin in a particular region of interest. The paper backing on the Tegaderm® tape may be removed so that the sensor module may freely follow facial deformations.

Figure 10:
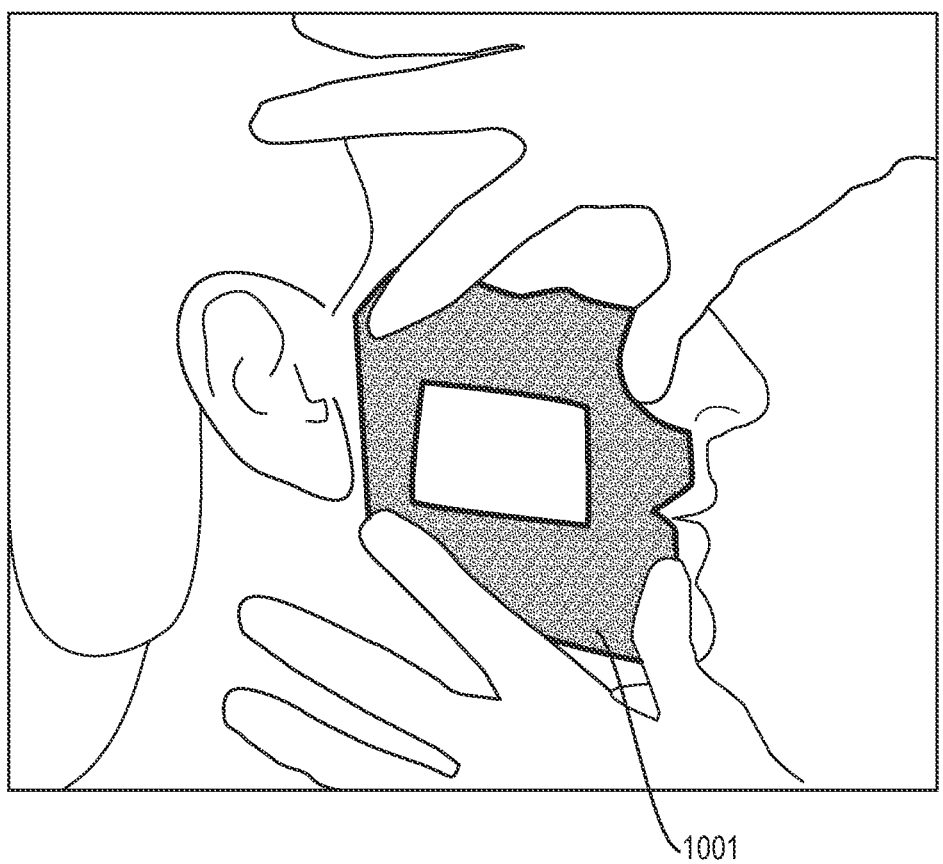
FIG. 10 shows an alignment scaffold.

FIG. 10 shows an example of an alignment scaffold. In the example shown in FIG. 10, the alignment scaffold 1001 is positioned on the user's face in such a way that edges of the scaffold are aligned with landmark features on the user's face, such as an edge of the nose.

Figure 11:
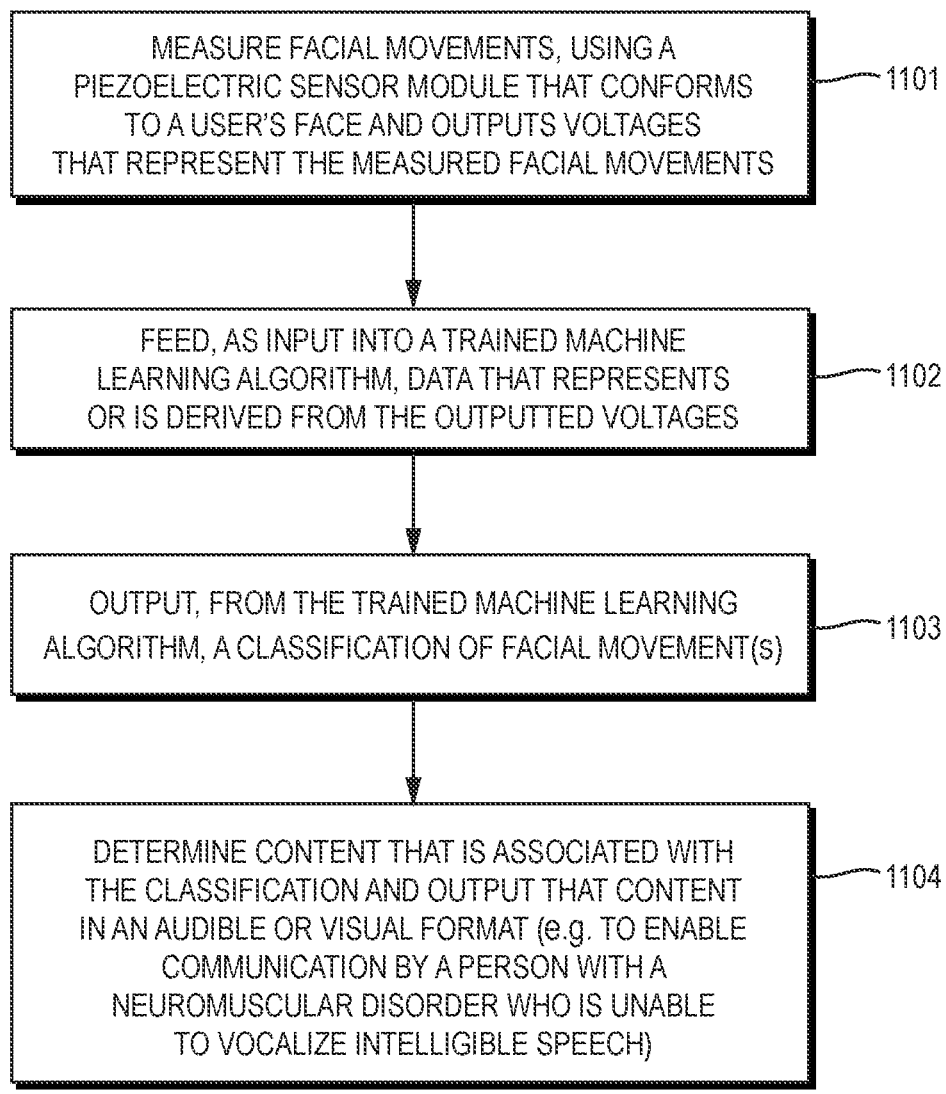
FIG. 11 is a flowchart of a method of detecting and classifying facial movements.

FIG. 11 is a flowchart of a method of detecting and classifying facial movements. In the example shown in FIG. 11, the method includes at least the following steps: Measure facial movements using a piezoelectric sensor module that conforms to facial skin of a user and that outputs voltages that represent the measured facial movements. (Step 1101). Feed, as input into a trained machine learning algorithm, data that represents or is derived from the outputted voltages (Step 1102). Output, from the trained machine learning algorithm, a classification of the facial movement(s) (Step 1103). Determine content that is associated with the classification and output that content in an audible or visual format (e.g., to enable communication by a person with a neuromuscular disorder who is unable to vocalize intelligible speech) (Step 1104).

Figure 12:
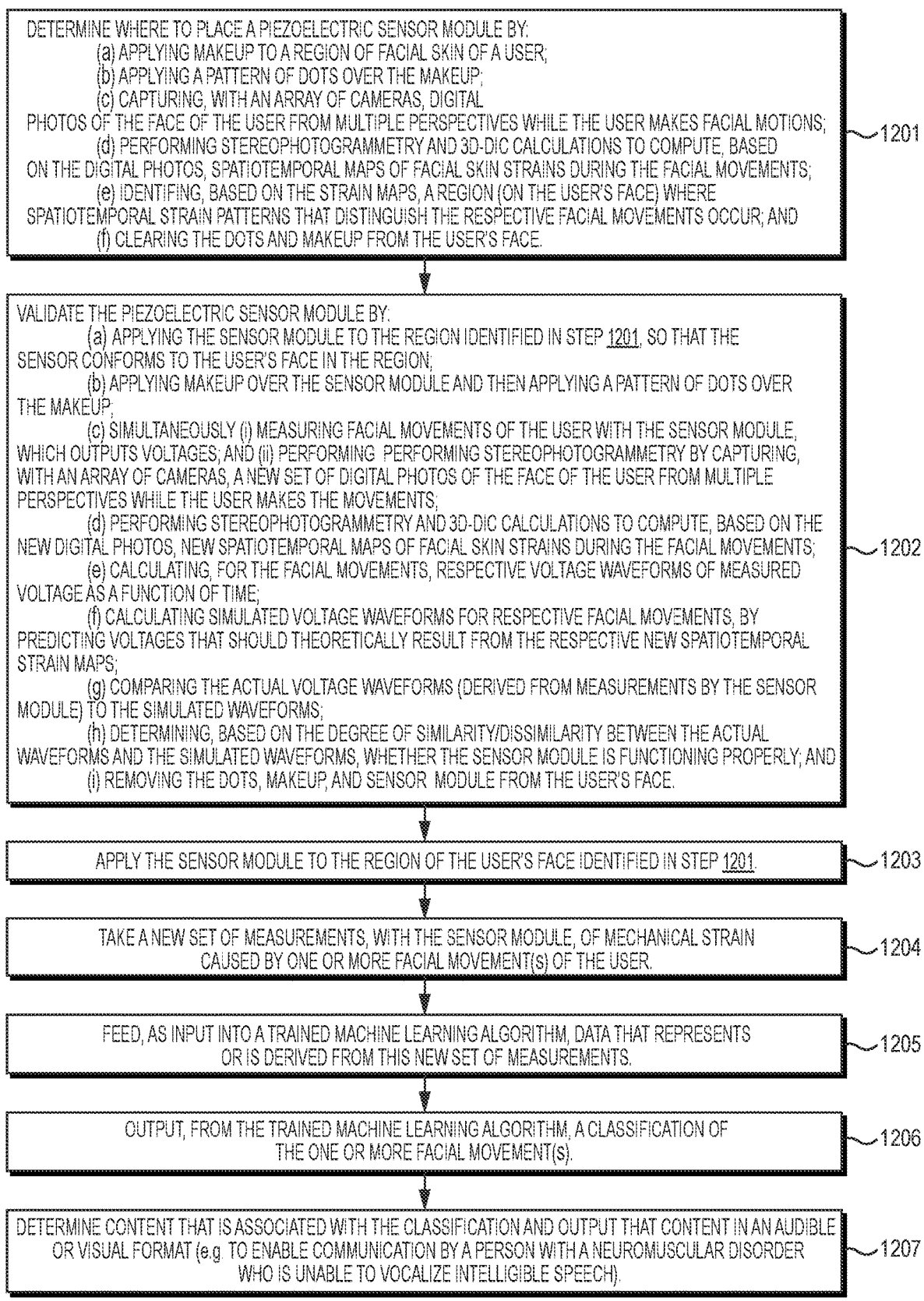
FIG. 12 is a flowchart of a method of calibrating an integrated system and then using the integrated system to detect and classify facial movements.

FIG. 12 is a flowchart of a method of calibrating an integrated system and then using the integrated system to detect and classify facial movements. In the example shown in FIG. 12, the method includes at least the following steps: Determine where to place a piezoelectric sensor module by: (a) applying makeup to a region of facial skin of a user; (b) applying a pattern of dots over the makeup; (c) capturing, with an array of cameras, digital images of the face of the user from multiple perspectives while the user makes facial motions; (d) performing stereophotogrammetry and 3D-DIC calculations to compute, based on the digital images, spatiotemporal maps of facial skin strains during the facial movements; (e) identifying, based on the strain maps, a region (on the user's face) where spatiotemporal strain patterns that distinguish the respective facial movements occur; and (f) clearing the dots and makeup from the user's face (Step 1201). Validate the piezoelectric sensor module by: (a) applying the sensor module to the region identified in Step 1201, so that the sensor module conforms to the user's face in the region; (b) applying makeup over the sensor module and then applying a pattern of dots over the makeup; (c) simultaneously (i) measuring facial movements of the user with the sensor module, which outputs voltages; and (ii) capturing, with an array of cameras, a new set of digital images of the face of the user from multiple perspectives while the user makes the movements; (d) performing stereophotogrammetry and 3D-DIC calculations to compute, based on the new digital images, new spatiotemporal maps of facial skin strains during the facial movements; (e) calculating, for the facial movements, respective voltage waveforms of measured voltage as a function of time; (f) calculating simulated voltage waveforms for the facial movements, by predicting voltages that should theoretically result from the new spatiotemporal strain maps; (g) comparing the actual voltage waveforms (derived from measurements by the sensor module) to the simulated waveforms; (h) determining, based on the degree of similarity/dissimilarity between the actual waveforms and the simulated waveforms, whether the sensor module is functioning properly; and (i) removing the dots, makeup, and sensor module from the user's face (Step 1202). Apply the sensor module to the region of the user's face identified in Step 1201 (Step 1203). Take a new set of measurements, with the sensor module, of voltage caused by one or more facial movement(s) of the user (Step 1204). Feed, as input into a trained machine learning algorithm, data that represents or is derived from this new set of measurements (Step 1205). Output, from the trained machine learning algorithm, a classification of the one or more facial movement(s) (Step 1206). Determine content that is associated with the classification and output that content in an audible or visual format (e.g., to enable communication by a person with a neuromuscular disorder who is unable to vocalize intelligible speech) (Step 1207).

Figure 13:
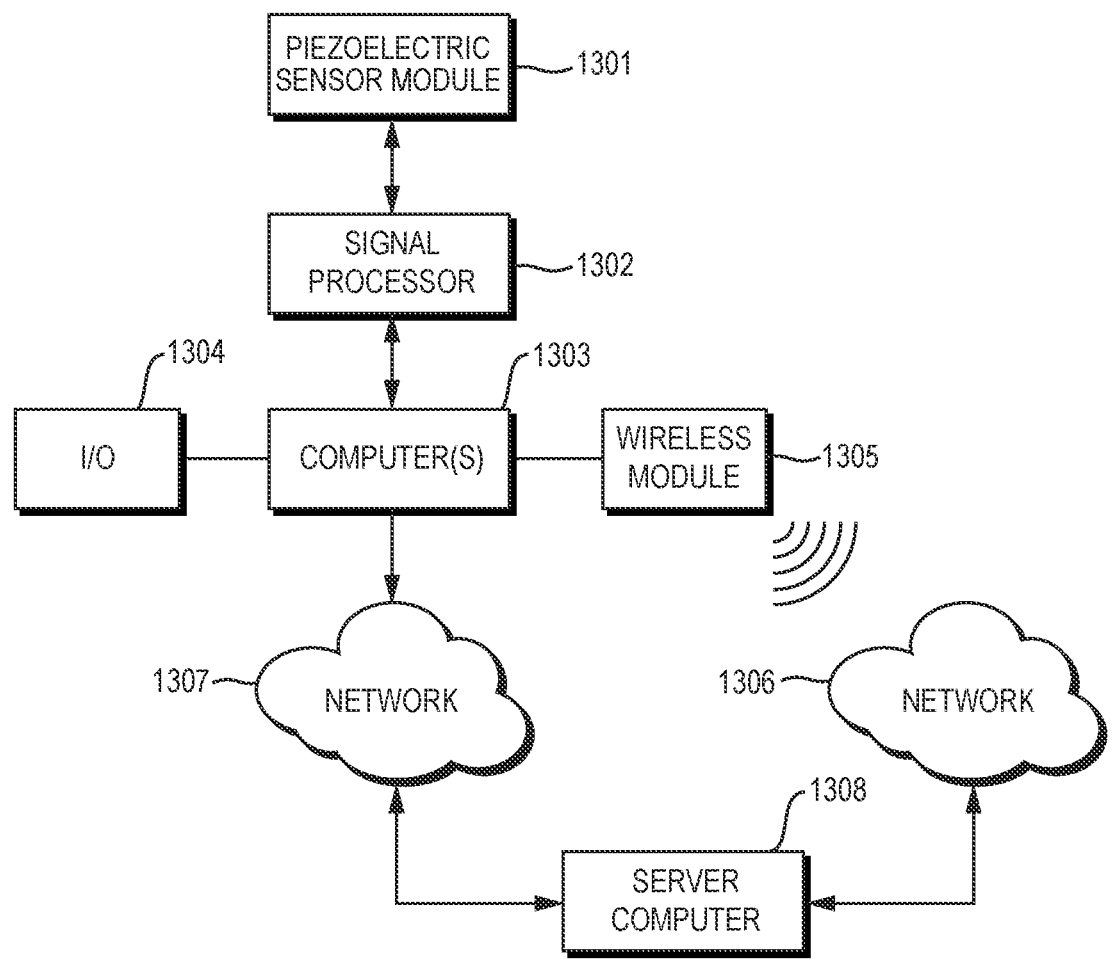
FIG. 13 is a diagram of an integrated system that detects and classifies facial movements.

FIG. 13 is a diagram of an integrated system that detects and classifies facial movements, in an illustrative implementation of this invention. In FIG. 13, the integrated system comprises a piezoelectric sensor module 1301, a signal processor 1302, one or more computers 1303, one or more input/output devices 1304, a wireless module 1305, and a server computer 1308. The sensor module may include multiple piezoelectric sensors that, taken together, record mechanical strain at multiple locations on a user's facial skin while a user makes a facial gesture. The piezoelectric sensors may output voltage waveforms. Signal processor 1302 may process voltage signals from the sensor module. For instance, signal processor 1302 may perform differential voltage amplification, analog signal filtering, and analog-to-digital conversion. For instance, computer(s) 1303 may comprise one or more processors, microprocessors, controllers or microcontrollers. Computer(s) 1303 may output instructions that cause an input/output device 1304 to output, in humanly perceptible format, information about the classification of the facial gesture. For instance, an electronic display screen (e.g., a computer monitor or touchscreen) may display, via a graphical user interface, a visual message that specifies the calculated classification of the facial gesture. In some cases, the computer(s) outputs data which is wirelessly transmitted by the wireless module 1305 or is transmitted via one or more wired connections. In some cases, the computer(s) 1303 communicate with one or more remote devices (such as server computer 1308) via one or more communication networks 1306, 1307. Each of these networks may transmit signals via one or more wired or wireless connections. Which computational tasks are performed by a given computer in the integrated system may vary, depending on the particular embodiment of this invention. For instance, either computer(s) 1303 or server computer 1308 or both may analyze the sensor measurements to detect and classify facial gestures.

Prototype

The following seventeen paragraphs describe a prototype of this invention.

In this prototype, aluminum nitride (AlN) is used as the piezoelectric material in the strain sensors in the sensor module. Advantageously, AlN is low cost, may be processed in complementary metal oxide semiconductor (CMOS)-compatible manner, and is lead-free. The kNN-DTW real-time decoding algorithm utilized in this prototype classifies facial motions based on piezoelectric voltage waveform shapes, so the relatively lower voltages generated by AlN piezoelectric material are not problematic.

In this prototype, the thickness of the AlN piezoelectric layer was chosen by considering the tradeoff between signal-to-noise ratio (SNR) and bendability of the sensor that comes with changing the thickness of AlN.

In this prototype, molybdenum was selected as the electrode material due to the reduced lattice mismatch it provides for the piezoelectric layer, as well as its compatibility to the MEMS process. The thickness (only 200 nm) and serpentine structures of the Mo electrodes enable increased stretchability.

In this prototype, silicon dioxide ($SiO_2$) is employed as an encapsulation material.

In this prototype, the AlN piezoelectric element in each piezoelectric sensor has a 1.5 µm thickness and a stiffness of 166 N/m.

In this prototype, the piezoelectric elements are much stiffer than the substrate material and human skin; therefore, changing the size (lateral area in the X-Y plane) of the piezoelectric elements affects the stiffness of the sensors. The chosen lateral area was determined by evaluating the trade-off between (i) large size diminishing spatial resolution of strain measurement while increasing the stiffness, and (ii) small size resulting in low voltage sensitivity. In this prototype, each circular piezoelectric sensing element has a radius of 0.24 cm and a lateral area of about 0.725 square centimeters. In this prototype, the shape of piezoelectric elements does not affect their stiffness as long as lateral area and thickness remain constant, which means a sensor module with square piezoelectric elements of side length $\sqrt{\pi}*r$ results in the same stiffness as a sensor module with circular piezoelectric elements of radius r.

In this prototype, a 2.5 cm×3.5 cm sensor module includes a ~1.1 cm×1.1 cm sensor array which covers the areas where dynamic deformations of the skin occur during facial motions. This size provides functionality without diminishing user comfort too greatly.

In this prototype, the microfabrication of a piezoelectric sensor starts from a standard wafer cleaning process on an eight-inch silicon (Si) test wafer. Then a layer of 50 nm-thick aluminum (Al) is deposited on the surface of the cleaned Si wafer. Using plasma-enhanced chemical vapor deposition, a silicon dioxide layer is grown on the Si wafer with the following precursors: $SiH_4$ (260 sccm), $N_2O$ (1000 sccm) and $N_2$ (500 sccm). Molybdenum (Mo) bottom electrode (200 nm-thick) is deposited onto the soft oxide layer by sputtering technique in the same deposition run, followed by an AlN bulk layer deposition (1.5 µm-thick). Both AlN seed and bulk layers are deposited using a pure Al target (99.9995%) in a mixture of Ar (20 sccm) and $N_2$ (20 sccm) gases in direct current (DC) pulsed power supply at 750 W and with a working pressure of 2.8×10−3 mbar. The Mo layer is sputtered using a pure Mo target (99.95%) in pure Ar atmosphere (66 sccm) under DC power supply of 400 W and a working pressure of 5×10−3 mbar. After the optical lithographic process to pattern AlN and Mo stacked layers, the Mo top layer is sputtered in the same condition of the Mo bottom electrode layer. The Mo top layer is dry etched by an inductively coupled plasma (ICP)-reactive ion etching (ME) system under the same conditions reported for the Mo bottom layer. PI2611 polyimide (PI) precursor solution is spin coated (PWM50) at 2000 rpm for 60 s on the Mo top electrode, followed by a curing process at 350° C. for 30 minutes performed on a hot plate. Then, a layer of polydimethylsiloxane (PDMS, matrix/crosslink ratio 1:10) is spin coated (1000 rpm, 60 s) and cured at 60° C. overnight in a curebox as an encapsulation layer.

In this prototype, after the micro-fabrication process, the piezoelectric sensor is released via an anodization process in a 3% NaCl solution. The microfabricated chip serves as the anode, while a chip coated with a layer of gold acted as the cathode. +2V potential is applied via a direct current power supply to the anode and cathode. After release, the sensor is placed upside down onto a glass plate and the $SiO_2$ layer is patterned to expose the bonding pads and form electrical connections using anisotropic conductive film (ACF) cables.

In this prototype, a 3D-DIC setup comprises six video cameras with adjustable lenses. The cameras are placed in a circular array around a single focal point in which the subject places her or his head during image acquisition. The cameras are placed along a circular arc (32 cm diameter) spanning 160 degrees, with each camera 32 degrees away from its neighbor, enabling full facial view within the captured images. In order to power and take images simultaneously from all cameras, each camera is connected via ethernet to an 8-port network switch as well as an adapter, which allows for connection to a computer with a PCIe x1 slot. To enable uniform lighting and higher contrast images, three 2-foot LED strips, each providing 384 lumens per foot, are placed on top of the cameras facing the subject, and 5800K COB (chip-on-board) lights are placed around the lens of each camera. All lights are connected to a single breadboard, and supply power from one of two 12-volt, 2-amp power supplies plugged directly into wall outlets. The 3D-DIC setup has sufficient spatial resolution (1.2 MP, 12-bit) to capture ~1.5 mm dot sizes and their random spacings and sufficient temporal resolution (6 fps) to capture natural facial deformations with no blurring in the regions of interest.

In this prototype, the cameras in the DIC setup capture images simultaneously at 6 frames per second (fps) during each motion. The delay between the first camera and the last camera image for each timestep is ~2 ms. A command line-based script in Python 3.6 acquires and saves images from multiple cameras. The script utilizes a FLIR® Spinnaker® SDK and the PySpin Python® library to interface with the cameras. The user may choose from three different modes of image acquisition: manual, timed and continuous. After image acquisition is completed, all images are rotated 270 degrees to correct the camera orientation and saved under the PNG file format. All images are taken in grayscale, and image naming followed the specifications for use with MultiDIC 40.

In this prototype, for image collection, the subject's skin surface of interest (e.g., temple or cheek) is first cleaned with water and dried with paper towels. The skin is then painted with non-toxic, water-based, white liquid makeup, which is applied in a thin layer with a paintbrush to provide a high-contrast background. A speckled dot pattern is applied on top of the dried background layer by airbrushing non-toxic, water-based, black liquid makeup through a stencil using an airbrush. Since this liquid makeup is water-based, it is easily washable. The stencil is generated by software, written in Python® 3.6, to produce a random non-overlapping speckle pattern (1.5 mm dot size, 50% fill). The speckle pattern is laser cut into a 1/16" (1.6 mm) thick, 10×11 cm wide rubber sheets in a 120 W CO2 laser cutter. After the facial skin is painted, the subject places her or his head within view of all cameras, and cameras are adjusted to the proper iris (light intake) and focal length (zoom) settings to allow for capture of clear images. The subject then removes her or his head from view of the cameras while images of a distortion correction object (flat checkerboard, 13×20 square grid, 11.4 mm edge length of each square) and a stereo calibration object (10 cm diameter cylindrical object, with ordered pattern of 3 mm square dots with 10 mm spacing) are acquired using adjusted camera settings. This step allowed for characterization of calibration errors (0.1 mm root-mean-squared (RMSE) error). Null strain tests serve as a control and may establish that errors from the entire 3D-DIC data collection process are at least one order of magnitude lower than the strains measured from almost all facial deformations. Images from three cameras are then acquired of the subject's face as the subject performs different facial motions.

In this prototype, after image collection, all images are edited in Adobe® Photoshop® CC 2019 in order to increase the contrast and clarity of the speckle pattern on the face. First, tonal range and color balance is adjusted using the "Levels" adjustment (grayscale bits 70 to 255 are kept, with gamma level of 0.7). Then, a "Despeckle" filter is applied as a low pass filter to decrease the noise in the image.

In this prototype, resultant images are processed using DIC methodology to create 3D models of the face from 2D images. A MATLAB®-based open-source software, Multi-DIC 40, is used for DIC processing and skin strain calculations. MultiDIC processing included the following steps: 1) distortion correction (for determination of each camera's radial and tangential distortion, skew, and focal length parameters), 2) stereo calibration (for determination of reconstruction of 3D point locations from 2D images of those points), 3) 2D-DIC (analysis of speckle images to determine spatiotemporal correlation coefficients and point cloud), 4) 3D-DIC (reconstruction of 3D points and surfaces), and 5) post processing (determination of surface strains and rigid body motions).

In this prototype, MATLAB® scripts interface with MultiDIC to extract local spatiotemporal strain values and correlation coefficients from the region of the face over which the sensor is placed. After selecting a point on a 3D strain map from MultiDIC's step 4 results and saving the coordinates as a variable, one such script may then plot the calculated values for all faces within a specified radius of this point and with a correlation coefficient below a specified maximum (e.g., 0.3). Figure graphs related to spatiotemporal strain data are created by running this script on a point selected in the center of the area of one of the piezoelectric sensing elements. Using the resultant strain graphs for 16 different motions (11 at the cheek, 5 at the temple), two regions of interest (one on the cheek, one on the temple) are identified for placement of the sensor module on the face. Strain values are also used to cross-validate sensor functionality and estimate the contribution of the surface strain to the sensor's voltage output.

In this prototype, facial motion capture is performed with a piezoelectric sensor module. In order to measure different facial motions, the sensor module is placed on the temple or the cheek of the subject in a location which shows moderate strain values during all the motions, based on DIC trials conducted on that subject. In this prototype, the sensor module is not placed in areas of large deformation, such as the corner of the lips or corner of the eye, due to higher likelihood of sensor breakage and/or impediment to normal facial motions. For the temple, this is below the eyebrow and halfway to the hairline. For the cheek, this is in the middle of the cheek directly under the outer edge of the eye and in line with the bottom of the nose. The sensor is fixed to the face using Tegaderm® tape and contact of the back of the sensor with the skin is achieved by applying a thin layer of DI water to the back of the sensor before lamination. The sensor is connected via an anisotropic conductive film (ACF) cable, printed circuit board, and 22 awg wire to a DAQ system with input impedance 1 MΩ||265 pF. The DAQ system has a software filter to remove 60 Hz noise. Data is recorded and saved as text files.

In this prototype, real time detection and classification of facial motions is performed. The sensor voltage is fed into a circuit for amplification, filtering, and analog-to-digital conversion. The 10-bit digital signal is sent to a Raspberry Pi 3 B+. Python® 3.6 software reads the stream of data from the sensor and classifies detected motions with their appropriate label. The classification model is a k-nearest neighbors dynamic time warping (kNN-DTW) algorithm, utilizing the Python® fastdtw library. Label assignment and model setup (e.g., setting number of nearest neighbor and warping radius) and training are performed once per subject before real-time decoding is conducted.

The prototype described in the preceding seventeen paragraphs is a non-limiting example of this invention. This invention may be implemented in many other ways.

Software

In the Computer Program Listing above, ten computer program files are listed. These ten computer program files comprise software employed in a prototype of this invention.

In order to submit these ten programs to the U.S. Patent and Trademark Office, the ten program files were converted to ASCII .txt format. In each of these ten programs, these changes may be reversed, so that the ten programs may be run. Specifically, these changes may be reversed by changing the file extension from ".txt" to ".py" in each of these ten program files.

This invention is not limited to the software set forth in these ten computer program files. Other software may be employed. Depending on the particular implementation, the software used in this invention may vary.

PT_Grey_Image_Acquisition.py ("Image Acquisition Script") is a command line-based Python® script that acquires and saves images from a photogrammetry setup of multiple Point Grey Blackfly GigE cameras. The following nine paragraphs describe the Image Acquisition Script and non-limiting examples of how it may be used.

The Image Acquisition Script utilizes a FLIR® Spinnaker® SDK (software development kit) and PySpin Python® library to interface with the cameras. Using this script, a user may choose from three different modes of image acquisition: manual, timed and continuous. After image acquisition is completed, all images are rotated 270 degrees for easier viewing and saved in PNG file format. All images are taken in grayscale, and image naming follows the specifications for use with MultiDIC.

The Image Acquisition Script may, for instance, be used with a 64-bit Windows® 10 operating system. The Image Acquisition Script is written in Python® 3.6, and uses the PySpin, datetime, time, os, and PIL Python® libraries. The FLIR® FlyCapture2 Viewer may be employed to show live streams of individual cameras while manually focusing them.

When using the Image Acquisition Script, the cameras may be focused by hand. The FLIR® FlyCapture2 Viewer may be used to view the camera livestream while adjusting. A user may select a camera by serial number to view the livestream. Cameras may be focused by turning the focus ring to infinity and then adjusting the iris ring until the desired brightness and focus is achieved. If using continuous mode, the packet delay may be increased. For instance, for a setup of 6 cameras, a packet delay of 10,000 works well. The FlyCapture2 Viewer may be closed completely before running the script.

When using the Image Acquisition Script, a user may be taken through several prompts to apply settings for the camera run. If the user provides an invalid input, the script terminates and may be re-run. Manual mode involves user interaction during image acquisition; other modes do not. Print statements occur at certain points throughout the program to signify when certain actions have been performed, such as acquiring a round of images or saving the images.

In the Image Acquisition Script, user interaction differs between the different acquisition modes. Some use cases and typical interactions with each mode are listed below.

Manual Mode (Image Acquisition Script): Manual mode may be used for runs in which the user wishes to trigger the cameras manually. After the cameras are initialized, the user may specify when to take an image by pressing the 'enter' button. Once the images for that round are acquired, the user may press 'enter' once again to take the next round of images. The user may signify that the camera run is complete by entering 'e' in the prompt, at which point the images are saved and the script terminates.

Timed Mode (Image Acquisition Script): Timed mode may be used for runs in which the user wishes to automatically take pictures but with a delay of at least one second in between each image round. The user may specify the desired number of images as well as the time delay between each image. Once the cameras are initialized, there is a 5 second delay before the script begins taking images. A tone sounds when image acquisition begins. After acquiring a round of images, the script "sleeps" for the specified time delay. Once the desired number of images are taken, the tone sounds again, all images are saved, and the script terminates. The current image round number is printed to the screen as the program progresses.

Continuous Mode (Image Acquisition Script): Continuous mode may be used for runs in which the user wishes to automatically take pictures with no time delay between each image round. The user specifies the desired number of images. Once the cameras are initialized, there is a 5 second delay before the script begins taking images. A tone will sound when image acquisition begins. The current image round will be printed to the screen as the script progresses. Once the desired number of images are taken, the tone sounds again, all images are saved, and the script terminates.

In the Image Acquisition Script, images are saved in the path specified during the script and camera setup. The default location path is " . . . \ Documents\Camera Runs", which was used for the specified equipment setup. If a new path location is entered for this setting, the validity of the specified path is checked during the input phase of the script. The entire run will exist in a folder with the naming format "Camera Run Year-Month-Day Hour Minute Second". Within this folder there will be several folders in the format "Camera Number". Within each camera folder are the images acquired from this image for the run, with the naming format "camNumberImage_x.png". All images are saved in grayscale and rotated 270 degrees. Image naming is compatible with MultiDIC.

The Image Acquisition Script described in the preceding nine paragraphs is a non-limiting example of software that may be employed to acquire images in this invention. Alternatively, other software may be employed instead (e.g., to control image acquisition and to process images).

The other nine computer programs listed in the Computer Program Listing together comprise real-time decoding (RTD) software. This RTD software may be used on any computing platform that may run Python® software, and which receives input from conformable piezoelectric strain sensors on a user's face.

As a non-limiting example, the RTD software may be employed to gather training data by running rt_calibrate_motions.py in the terminal, following and answering the terminal prompts. Next, real-time classification may be performed by running rt_main.py in the terminal, following and answering the terminal prompts. All other files are support files and there is no need to run those in the terminal.

Computers

In illustrative implementations of this invention, one or more computers (e.g., servers, network hosts, client computers, integrated circuits, microcontrollers, controllers, microprocessors, processors, field-programmable-gate arrays, personal computers, digital computers, driver circuits, or analog computers) are programmed or specially adapted to perform one or more of the following tasks: (1) to control the operation of, or interface with, hardware components of an integrated facial detection and classification system, including any piezoelectric sensor, signal processor, camera, and light source for illuminating scenes, (2) to calculate spatiotemporal strain maps based on voltages outputted by piezoelectric sensors; (3) to perform stereophotogrammetry and digital image correlation (DIC) calculations, including two-dimensional DIC calculations and three-dimensional DIC calculations; (4) to predict voltage waveforms that would be measured if a given spatiotemporal strain pattern occurs; (5) to compare predicted and actual voltage waveforms and, if they are sufficiently similar, to validate a piezoelectric sensor or sensor module; (5) to select a location, on a user's face, at which a piezoelectric sensor module may be placed in order to maximize—or to achieve at least an acceptable-classification accuracy; (6) to receive data from, control, or interface with one or more sensors; (7) to perform any other calculation, computation, program, algorithm, or computer function described or implied herein; (8) to receive signals indicative of human input; (9) to output signals for controlling transducers for outputting information in human perceivable format; (10) to process data, to perform computations, and to execute any algorithm or software; and (11) to control the read or write of data to and from memory devices (tasks 1-11 of this sentence being referred to herein as the "Computer Tasks"). The one or more computers (e.g., 1303, 1308) may each comprise: (a) a central processing unit, (b) an ALU (arithmetic logic unit), (c) a memory unit, and (d) a control unit that controls actions of other components of the computer in such a way that encoded steps of a program are executed in a sequence. In some cases, the one or more computers communicate with each other or with other devices: (a) wirelessly; (b) by a wired connection, such as an electrical wire, an electrical cable or a fiber-optic link; or (c) by a combination of wireless and wired links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more devices (e.g., 1301, 1302, 1303, 1304, 1308) are configured for wireless or wired communication with other devices in a network.

For example, in some cases, one or more of these devices include a wireless module for wireless communication with other devices in a network. Each wireless module (e.g., 1305) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 1303, 1308) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UNITS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" means a computational device that is configured to perform logical and arithmetic operations. Each of the following is a non-limiting example of a "computer", as that term is used herein: (a) digital computer; (b) analog computer; (c) computer that performs both analog and digital computations; (d) microcontroller; (e) controller; (f) microprocessor; (g) processor; (h) field-programmable gate array; (i) tablet computer; (j) notebook computer; (k) laptop computer, (1) personal computer; (m) mainframe computer; (n) integrated circuit; (o) server computer; (p)

client computer; and (q) quantum computer. However, a human is not a "computer", as that term is used herein.

"Computer Tasks" is defined above.

A non-limiting example of "data regarding" is data derived from.

"Defined Term" means a term or phrase that is set forth in quotation marks in this Definitions section.

"DIC" means digital image correlation.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number (e.g., "1" or "S1") set forth to the right of the equation. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, speaker, or projector for projecting a visual display.

To "multiply" includes to multiply by an inverse. Thus, to "multiply" includes to divide.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A group with no elements is not a "set", as that term is used herein.

Unless the context clearly indicates otherwise, "some" means one or more.

As used herein, "strain" means mechanical strain.

As used herein, a "subset" of a set consists of less than all of the elements of the set.

The term "such as" means for example.

"2D" means two-dimensional.

"3D" means three-dimensional.

To say that a machine-readable medium is "transitory" means that the medium is a transitory signal, such as an electromagnetic wave.

As used herein: (a) a non-limiting example of a "waveform" is a set of discrete datapoints, where each of the datapoints has a time value and a voltage value; and (b) another non-limiting example of a "waveform" is a curve that is fitted to a set of discrete datapoints, where each of the datapoints has a time value and a voltage value.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) taking measurements of mechanical strain of facial skin at multiple locations on a user's face at each of multiple times while a user makes a facial gesture; (b) performing a machine learning algorithm that (i) takes, as an input, data regarding the measurements and (ii) calculates a classification of the facial gesture; and (c) outputting a signal that conveys or encodes (i) the classification or (ii) information which is associated, by a computer, with the classification; wherein the taking measurements is performed by piezoelectric sensors while the sensors are touching the facial skin. In some cases, each of the piezoelectric sensors includes a piezoelectric structure which has a thickness that is greater than or equal to 10 nanometers and less than or equal to five micrometers. In some cases, each of the piezoelectric sensors includes: (a) a piezoelectric structure that comprises aluminum nitride; (b) molybdenum electrodes; (c) a silicon dioxide layer, and (d) a polydimethylsiloxane layer. In some case: (a) the information associated with the classification comprises one or more words; and (b) the signal comprises audible sound or a visual display. In some cases: (a) the information associated with the classification comprises an instruction for a device to perform an action or to change a state; and (b) the signal is an electrical signal or a wireless radio signal. In some cases, average time lag between completion of the facial gesture and the outputting a signal is less than two seconds. In some cases, the machine learning algorithm comprises a k-nearest neighbors dynamic time warping algorithm. In some cases: (a) the method further comprises training the machine learning algorithm on a training dataset; (b) the training occurs before the steps of claim 1; and (c) the training dataset comprises labeled voltage waveforms that are recorded by the piezoelectric sensors while facial gestures are made. In some cases, the method further includes a process which occurs before the steps listed in claim 1 and which comprises: (a) taking digital images of the user's face from each of multiple different vantage points while a user makes a temporal sequence of different facial expressions; (b) calculating, based on the digital images, spatiotemporal strain maps for respective spatiotemporal patterns of mechanical strain of the facial skin that occur while the user makes the different facial expressions; and (c) selecting a location on the facial skin at which to position a sensor module that includes the piezoelectric sensors, the selecting being performed in such a way that each of the respective spatiotemporal patterns of mechanical strain would be distinguishable by the piezoelectric sensors if the sensor module were positioned at the location. In some cases, the method further includes a process that occurs before the steps listed in claim 1 and that comprises: (a) while a user makes a temporal sequence of different facial expressions, simultaneously (i) taking digital images of the user's face from each of multiple different vantage points, and (ii) outputting, from the piezoelectric sensors, a first set of voltages which represent measured mechanical strain; (b) calculating, based on the digital images, spatiotemporal strain maps for respective spatiotemporal patterns of mechanical strain of the facial skin that occur while the user makes the different facial expressions; (c) predicting, based on the spatiotemporal strain maps, a second set of voltages; (d) calculating a measure of distance between the first and second sets of voltages; and (e) if the measure of distance is greater than a threshold amount, determining that the piezoelectric sensors are not accurate or should not be used. Each of the cases described above in this paragraph is an example of the method described in the first sentence of this paragraph, and is also an example of an embodiment of this invention that may be combined with other embodiments of this invention. Also, the method described in the first sentence of this paragraph may be combined with other embodiments of this invention.

In some implementations, this invention is a system comprising: (a) a plurality of piezoelectric sensors; and (b) one or more computers; wherein (i) the piezoelectric sensors are configured to take measurements of mechanical strain of facial skin at multiple locations on a user's face at each of multiple times while (A) the piezoelectric sensors are touching the facial skin and (B) the user makes a facial gesture; and (ii) the one or more computers are programmed to (A) to perform a machine learning algorithm that takes data regarding the measurements as an input and that outputs a a classification of the facial gesture; and (B) to output a signal that conveys or encodes (I) the classification or (II) information which is associated, by the one or more computers, with the classification. In some cases, each of the piezoelectric sensors includes a piezoelectric structure which has a thickness that is greater than or equal to 10 nanometers and less than or equal to five micrometers. In some cases, each of the piezoelectric sensors includes: (a) a piezoelectric structure that comprises aluminum nitride; (b) molybdenum electrodes; (c) a silicon dioxide layer, and (d) a polydimethylsiloxane layer. In some cases: (a) the information associated with the classification comprises one or more words; and (b) the signal comprises an instruction for one or more transducers to output the one or more words as audible sound or as a visual display. In some cases, the information associated with the classification comprises an instruction for a device to perform an action or to change a state. In some cases, the system is configured in such a way that average time lag between completion of the facial gesture and the outputting a signal is less than two seconds. In some cases, the machine learning algorithm comprises a k-nearest neighbors dynamic time warping algorithm. In some cases, the one or more computers are further programmed to train the machine learning algorithm on a training dataset, which training dataset comprises labeled voltage waveforms recorded by the piezoelectric sensors while facial gestures are made. In some cases: (a) the system further comprises a set of cameras; and (b) the one or more computers are further programmed to perform additional steps before the steps listed in claim 1, which additional steps comprise (i) causing the set of cameras to take digital images of the user's face from each of multiple different vantage points while a user makes a temporal sequence of different facial expressions, (ii) calculating, based on the digital images, spatiotemporal strain maps for respective spatiotemporal patterns of mechanical strain of the facial skin that occur while the user makes the different facial expressions, and (iii) selecting a location on the facial skin at which to position a sensor module that includes the piezoelectric sensors, the selecting being performed in such a way that each of the respective spatiotemporal patterns of mechanical strain would be distinguishable by the piezoelectric sensors if the sensor module were positioned at the location. In some cases: (a) the system further comprises a set of cameras; and (b) the one or more computers are further programmed to perform additional steps before the steps listed in claim 1, which additional steps comprise (i) while a user makes a temporal sequence of different facial expressions, simultaneously (A) causing the set of cameras to take digital images of the user's face from each of multiple different vantage points, and (B) accepting, from the piezoelectric sensors, data regarding a first set of voltages which represent measured mechanical strain, (ii) calculating, based on the digital images, spatiotemporal strain maps for respective spatiotemporal patterns of mechanical strain of the facial skin that occur while the user makes the different facial expressions, (iii) predicting, based on the spatiotemporal strain maps, a second set of voltages, (iv) calculating a measure of distance between the first and second sets of voltages, and (v) if the measure of distance is greater than a threshold amount, determining that the piezoelectric sensors are not accurate or should not be used. Each of the cases described above in this paragraph is an example of the system described in the first sentence of this paragraph, and is also an example of an embodiment of this invention that may be combined with other embodiments of this invention. Also, the system described in the first sentence of this paragraph may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
   (a) taking digital images of a user's face from each of multiple different vantage points while a user makes a temporal sequence of different facial expressions;
   (b) calculating, based on the digital images, spatiotemporal strain maps for respective spatiotemporal patterns of mechanical strain of a facial skin of the user's face that occur while the user makes the different facial expressions;
   (c) selecting a location on the facial skin at which to position a sensor module that includes piezoelectric sensors, the selecting being performed in such a way that each of the respective spatiotemporal patterns of mechanical strain would be distinguishable by the piezoelectric sensors if the sensor module were positioned at the location;
   (d) taking measurements of mechanical strain of facial skin at multiple locations on a user's face at each of multiple times while the user makes a facial gesture;
   (e) performing a machine learning algorithm that (i) takes, as an input, data regarding the measurements and (ii) calculates a classification of the facial gesture; and
   (f) outputting a signal that conveys or encodes (i) the classification or (ii) information which is associated, by a computer, with the classification;
   wherein the taking measurements is performed by the piezoelectric sensors while the piezoelectric sensors are touching the facial skin; and
   wherein steps (a), (b), (c) occur before steps (d), (e), (f).

2. The method of claim 1, wherein each of the piezoelectric sensors includes a piezoelectric structure which has a thickness that is greater than or equal to 10 nanometers and less than or equal to five micrometers.

3. The method of claim 1, wherein each of the piezoelectric sensors includes: (a) a piezoelectric structure that comprises aluminum nitride; (b) molybdenum electrodes; (c) a silicon dioxide layer, and (d) a polydimethylsiloxane layer.

4. The method of claim 1, wherein:
   (a) the information associated with the classification comprises one or more words; and
   (b) the signal comprises audible sound or a visual display.

5. The method of claim 1, wherein:
   (a) the information associated with the classification comprises an instruction for a device to perform an action or to change a state; and
   (b) the signal is an electrical signal or a wireless radio signal.

6. The method of claim 1, wherein average time lag between completion of the facial gesture and the outputting a signal is less than two seconds.

7. The method of claim 1, wherein the machine learning algorithm comprises a k-nearest neighbors dynamic time warping algorithm.

8. The method of claim 1, wherein:
   (a) the method further comprises training the machine learning algorithm on a training dataset;
   (b) the training occurs before the steps of claim 1; and
   (c) the training dataset comprises labeled voltage waveforms that are recorded by the piezoelectric sensors while facial gestures are made.

9. A method comprising:
   (a) while a user makes a temporal sequence of different facial expressions, simultaneously
      (i) taking digital images of the user's face from each of multiple different vantage points, and
      (ii) outputting, frompiezoelectric sensors, a first set of voltages which represent measured mechanical strain;
   (b) calculating, based on the digital images, spatiotemporal strain maps for respective spatiotemporal patterns of mechanical strain of a facial skin that occur while the user makes the different facial expressions;
   (c) predicting, based on the spatiotemporal strain maps, a second set of voltages;
   (d) calculating a measure of distance between the first and second sets of voltages;
   (e) if the measure of distance is greater than a threshold amount, determining that the piezoelectric sensors are not accurate or should not be used;
   (f) taking measurements of mechanical strain of facial skin at multiple locations on a user's face at each of multiple times while the user makes a facial gesture;
   (g) performing a machine learning algorithm that (i) takes, as an input, data regarding the measurements and (ii) calculates a classification of the facial gesture; and
   (h) outputting a signal that conveys or encodes (i) the classification or (ii) information which is associated, by a computer, with the classification;

wherein taking measurements is performed by the piezoelectric sensors while the piezoelectric sensors are touching the facial skin; and wherein steps (a), (b), (c) occur before steps (d), (e), (f).

10. A system comprising:
(a) the system further comprises a set of cameras; and
(b) the one or more computers are further programmed to perform additional steps, which additional steps comprise
(i) causing the set of cameras to take digital images of the user's face from each of multiple different vantage points while a user makes a temporal sequence of different facial expressions,
(ii) calculating, based on the digital images, spatiotemporal strain maps for respective spatiotemporal patterns of mechanical strain of the facial skin that occur while the user makes the different facial expressions, and
(iii) selecting a location on the facial skin at which to position a sensor module that includes the piezoelectric sensors, the selecting being performed in such a way that each of the respective spatiotemporal patterns of mechanical strain would be distinguishable by the piezoelectric sensors if the sensor module were positioned at the location;
(iv) a plurality of piezoelectric sensors; and
(v) one or more computers;
wherein
(a) the piezoelectric sensors are configured to take measurements of mechanical strain of facial skin at multiple locations on a user's face at each of multiple times while (A) the piezoelectric sensors are touching the facial skin and (B) the user makes a facial gesture; and
(b) the one or more computers are programmed to
(i) to perform a machine learning algorithm that takes data regarding the measurements as an input and that outputs a classification of the facial gesture; and
(ii) to output a signal that conveys or encodes (I) the classification or (II) information which is associated, by the one or more computers, with the classification; and
wherein steps (i), (ii), (iii) occur before steps (iv), (v).

11. The system of claim 10, wherein each of the piezoelectric sensors includes a piezoelectric structure which has a thickness that is greater than or equal to 10 nanometers and less than or equal to five micrometers.

12. The system of claim 10, wherein each of the piezoelectric sensors includes: (a) a piezoelectric structure that comprises aluminum nitride; (b) molybdenum electrodes; (c) a silicon dioxide layer, and (d) a polydimethylsiloxane layer.

13. The system of claim 10, wherein:
(a) the information associated with the classification comprises one or more words; and
(b) the signal comprises an instruction for one or more transducers to output the one or more words as audible sound or as a visual display.

14. The system of claim 10, wherein the information associated with the classification comprises an instruction for a device to perform an action or to change a state.

15. The system of claim 10, wherein the system is configured in such a way that average time lag between completion of the facial gesture and the outputting a signal is less than two seconds.

16. The system of claim 10, wherein the machine learning algorithm comprises a k-nearest neighbors dynamic time warping algorithm.

17. The system of claim 10, wherein the one or more computers are further programmed to train the machine learning algorithm on a training dataset, which training dataset comprises labeled voltage waveforms recorded by the piezoelectric sensors while facial gestures are made.

18. A system comprising:
(a) the system further comprises a set of cameras; and
(b) the one or more computers are further programmed to perform additional steps, which comprise
(i) while a user makes a temporal sequence of different facial expressions, simultaneously
(A) causing the set of cameras to take digital images of the user's face from each of multiple different vantage points, and
(B) accepting, from the piezoelectric sensors, data regarding a first set of voltages which represent measured mechanical strain,
(ii) calculating, based on the digital images, spatiotemporal strain maps for respective spatiotemporal patterns of mechanical strain of the facial skin that occur while the user makes the different facial expressions,
(iii) predicting, based on the spatiotemporal strain maps, a second set of voltages,
(iv) calculating a measure of distance between the first and second sets of voltages, and
(v) if the measure of distance is greater than a threshold amount, determining that the piezoelectric sensors are not accurate or should not be used;
(vi) a plurality of piezoelectric sensors; and
(vii) one or more computers;
wherein
(a) the piezoelectric sensors are configured to take measurements of mechanical strain of facial skin at multiple locations on a user's face at each of multiple times while (A) the piezoelectric sensors are touching the facial skin and (B) the user makes a facial gesture; and
(b) the one or more computers are programmed to
(i) to perform a machine learning algorithm that takes data regarding the measurements as an input and that outputs a classification of the facial gesture; and
(ii) to output a signal that conveys or encodes (I) the classification or (II) information which is associated, by the one or more computers, with the classification; and
wherein steps (i), (ii), (iii), (iv), (v) occur before steps (vii), (vii).

* * * * *